(12) United States Patent
Jaiswal

(10) Patent No.: US 11,805,030 B1
(45) Date of Patent: Oct. 31, 2023

(54) TECHNIQUES FOR NETWORK PACKET EVENT RELATED SCRIPT EXECUTION

(71) Applicant: VMware, Inc., Palo Alto, CA (US)

(72) Inventor: Suraj Jaiswal, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 45 days.

(21) Appl. No.: 17/385,794

(22) Filed: Jul. 26, 2021

Related U.S. Application Data

(62) Division of application No. 16/297,429, filed on Mar. 8, 2019, now Pat. No. 11,075,823.

(60) Provisional application No. 62/753,671, filed on Oct. 31, 2018.

(51) Int. Cl.
  *H04L 41/5041* (2022.01)
  *G06F 9/455* (2018.01)

(52) U.S. Cl.
  CPC ...... *H04L 41/5041* (2013.01); *G06F 9/45558* (2013.01); *G06F 2009/45595* (2013.01)

(58) Field of Classification Search
  CPC ....... G06F 9/45558; G06F 2009/45595; H04L 41/5041
  See application file for complete search history.

(56) References Cited

U.S. PATENT DOCUMENTS

| | | |
|---|---|---|
| 6,606,585 B1 | 8/2003 | Borowsky et al. |
| 8,606,925 B2 | 12/2013 | Bailey et al. |
| 8,683,479 B1 | 3/2014 | Arlitt et al. |
| 9,483,286 B2 | 11/2016 | Basavaiah et al. |
| 10,802,874 B1 | 10/2020 | Palsule et al. |
| 11,075,823 B1 | 7/2021 | Jaiswal |
| 2006/0165116 A1 | 7/2006 | Bayus et al. |
| 2010/0205416 A1 | 8/2010 | Lanner et al. |
| 2010/0299675 A1 | 11/2010 | Yuyitung et al. |
| 2011/0145830 A1 | 6/2011 | Yamaguchi |
| 2011/0302578 A1 | 12/2011 | Isci et al. |
| 2012/0096365 A1* | 4/2012 | Wilkinson .............. G06F 9/468 715/740 |
| 2012/0151480 A1 | 6/2012 | Diehl et al. |
| 2012/0159471 A1 | 6/2012 | Souza et al. |

(Continued)

OTHER PUBLICATIONS

Author Unknown, "Embed the Power of Lua into NGINX HTTP Servers," Feb. 26, 2019, 137 pages, Github.com, retrieved from https://web.archive.org/web/20190226065637/https://github.com/openresty/lua-nginx-module.

*Primary Examiner* — Gil H. Lee
(74) *Attorney, Agent, or Firm* — ADELI LLP

(57) ABSTRACT

Configuring network packet event related execution is disclosed, including: receiving a set of virtual service configuration information associated with a specified virtual service; using the set of virtual service configuration information to generate a set of event context information corresponding to the virtual service; and storing the set of event context information in a shared memory. Executing scripts related to a network packet event is disclosed, including: determining, using a service engine data path (SEDP) executing at the core, an event associated with a received network packet directed to a virtual service; determining a set of scripts to be executed corresponding to the event; generating a child interpreter context corresponding to the parent interpreter context corresponding to the virtual service; and using the child interpreter context to execute the set of scripts in the core specific memory corresponding to the core.

20 Claims, 13 Drawing Sheets

(56) References Cited

U.S. PATENT DOCUMENTS

| | | |
|---|---|---|
| 2012/0239376 A1 | 9/2012 | Kraft et al. |
| 2013/0036425 A1 | 2/2013 | Zimmermann |
| 2013/0117422 A1 | 5/2013 | Nelson et al. |
| 2013/0339560 A1 | 12/2013 | Aoshima |
| 2013/0346992 A1 | 12/2013 | Sonoyama et al. |
| 2014/0244791 A1 | 8/2014 | Fellows et al. |
| 2014/0304712 A1 | 10/2014 | Kim et al. |
| 2015/0347194 A1 | 12/2015 | Che et al. |
| 2015/0370577 A1* | 12/2015 | Vishwanath ............ G06F 16/00 718/100 |
| 2016/0182284 A1 | 6/2016 | Ayanam et al. |
| 2016/0203031 A1 | 7/2016 | Chai et al. |
| 2016/0307141 A1 | 10/2016 | Wu et al. |
| 2016/0342335 A1 | 11/2016 | Dey et al. |
| 2016/0378554 A1 | 12/2016 | Gummaraju et al. |
| 2016/0378568 A1 | 12/2016 | Knox et al. |
| 2018/0101395 A1 | 4/2018 | Aleksandrov et al. |
| 2018/0150511 A1 | 5/2018 | Chen et al. |
| 2018/0157568 A1 | 6/2018 | Wagner |
| 2018/0332138 A1 | 11/2018 | Liu et al. |
| 2019/0097969 A1 | 3/2019 | Voss et al. |

\* cited by examiner

TECHNIQUES FOR NETWORK PACKET EVENT RELATED SCRIPT EXECUTION

CLAIM OF BENEFIT TO PRIOR APPLICATIONS

This application is a divisional application of U.S. patent application Ser. No. 16/297,429, filed Mar. 8, 2019. U.S. patent application Ser. No. 16/297,429 claims priority to U.S. Provisional Patent Application 62/753,671 entitled SYSTEM AND METHOD FOR SCRIPTING PACKET DATA PATH IN MULTI-PROCESSOR SYSTEMS filed Oct. 31, 2018. U.S. patent application Ser. No. 16/297,429 and U.S. Provisional Patent Application 62/753,671 are incorporated herein by reference.

BACKGROUND OF THE INVENTION

In conventional distributed computing environments, scripts to be executed at various events associated with processing a network packet are usually manually generated for each virtual service that is configured to process network packets. As a result, even if a particular script is to be used by different virtual services, a separate copy of the script needs to be manually configured for each virtual service. When the script is to be updated, each copy of the script that is configured for each virtual service would need to be similarly changed. However, manually configuring and updating potentially multiple copies of scripts corresponding to respective virtual services is cumbersome, error-prone, and inefficient.

Furthermore, another disadvantage of the conventional distributed computing environments is that they require shutting down a virtual service while the scripts are being reconfigured. As such, while scripts are being reconfigured, network packets that are sent to the virtual service may be dropped.

BRIEF DESCRIPTION OF THE DRAWINGS

Various embodiments of the invention are disclosed in the following detailed description and the accompanying drawings.

DETAILED DESCRIPTION

Figure 1:
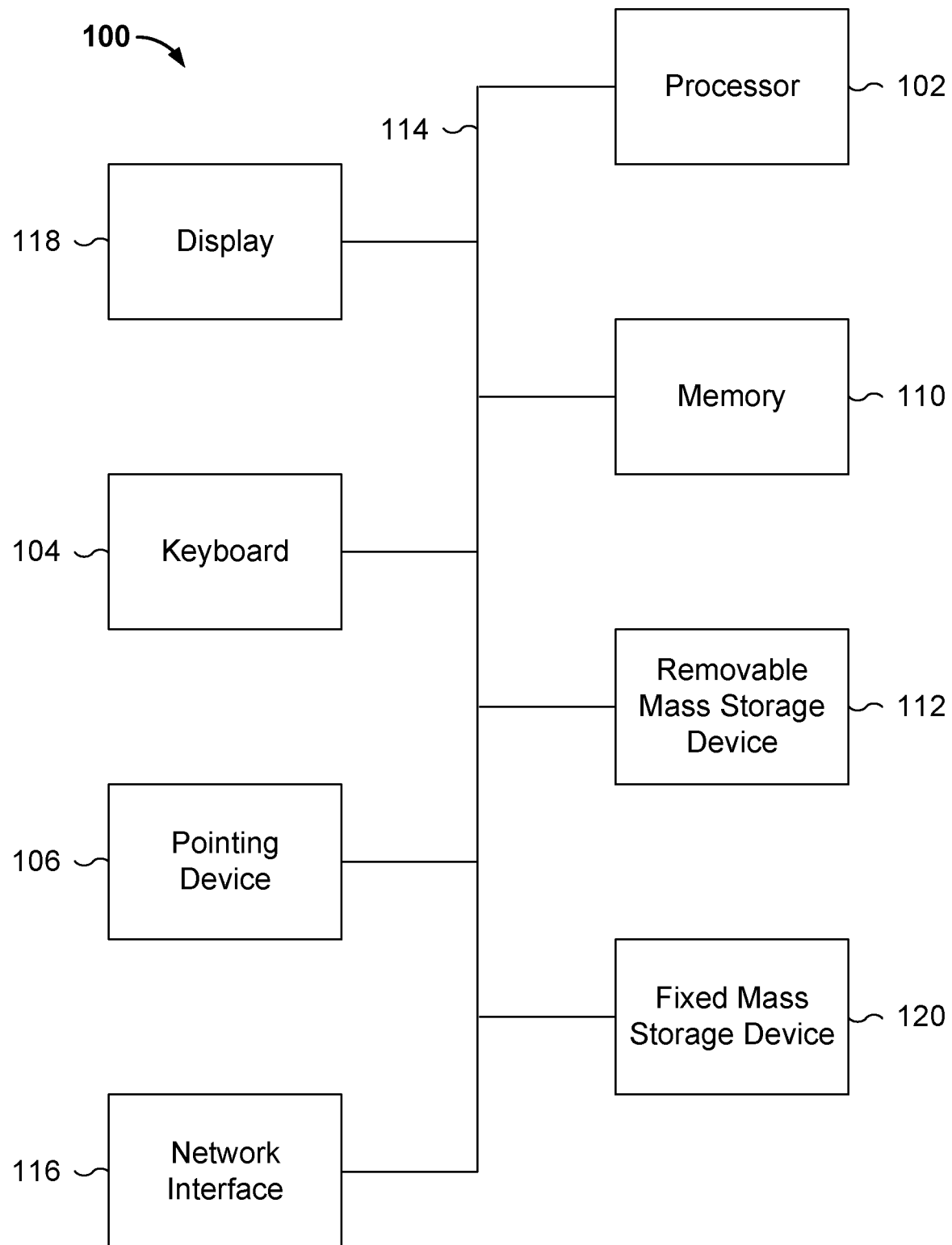
FIG. 1 is a functional diagram illustrating a programmed computer system for network packet event related script execution in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of configuring virtual service configuration information including network packet event related script execution are described herein. In various embodiments, a "script" is a piece of executable code, in general, implemented in an interpreted language for the flexibility of write and run. During configuration time, a set of virtual service configuration information associated with a specified virtual service is received at a service engine. For example, multiple sets of virtual service configuration information may be received at the service engine, where each set of virtual service configuration information is associated with a different virtual service. A "virtual service" provides networking-related services to packets transmitted to and from the service engine. Examples of a virtual service include a load balancer, a firewall, a Domain Name Service (DNS) service, etc. In various embodiments, a "service engine" comprises a data path for the processing of data packets that are associated with one or more virtual services that the service engine is configured to provide. A set of virtual service configuration information includes a plurality of script objects and/or other information that is usable to associate a network packet with a specified virtual service (e.g., an Internet Protocol (IP) address and/or one or more port values). The scripts that are identified in the set of virtual service configuration information associated with a virtual service can be executed to perform one or more functions associated with that virtual service. In some embodiments, a script object is defined in a script object model that is shared across various types of virtual services. A "script object model" comprises a collection of script objects associated with specific network packet events. In some embodiments, a script object comprises one or more scripts to be executed corresponding to one or more specified events associated with a network packet that is processed by a virtual service. The set of virtual service configuration information is used to generate a set of event context information. The set of event context information comprises the per-event identification of one or more relevant scripts that are found in the set of virtual service configuration information. The set of event context information is stored in a shared memory of the service engine. The shared memory is accessible to a set of one or more service engine data path (SEDP) processes associated with the service engine. In various embodiments, the service engine is to be configured to implement the specified virtual service(s) (for which the set of configuration information was received). In various embodiments, an SEDP comprises a process that is executing at a corresponding core (e.g., processor) of the service engine. During runtime, a network packet that is received by the service engine is distributed to an SEDP of the service engine. The recipient SEDP identifies a virtual service, if any, which is provided by the service engine, to which the network packet is directed. The SEDP then uses the set of event context information associated with the identified, applicable virtual service that is stored in the shared memory to identify and execute one or more scripts corresponding to a detected event in association with the network packet.

Embodiments of network packet event related script execution by a virtual service during runtime are described herein. During runtime, an event associated with a received network packet directed to a virtual service is determined using a core associated with a service engine that is implementing the virtual service. An SEDP process runs on the core and the core is associated with a corresponding parent interpreter context for each virtual service that the service engine is configured to provide. The virtual service specific parent interpreter contexts that are associated with each core are located in a core specific memory that corresponds to the core in the service engine. In various embodiments, a "parent interpreter context" comprises a data structure or a library that can interpret (or execute) scripts at runtime. In various embodiments, a "core specific memory" (which is also sometimes referred to as a "per core memory" or a "SEDP specific memory) is a memory that can only be accessed by processes executing at the core to which the memory corresponds. The set of scripts to be executed corresponding to the event is determined based at least in part on a plurality of scripts that is included in a set of virtual service configuration information that is associated with the virtual service to which the network packet is directed. A child interpreter context (or a child thread/co-routine) corresponding to the virtual service specific parent interpreter context is generated in the core specific memory corresponding to the core. The child interpreter context is used to execute the set of scripts corresponding to the event. In various embodiments, a "child interpreter context" comprises a data structure or a library that can interpret (or execute) scripts at runtime. The child interpreter context is different from the parent interpreter context.

FIG. 1 is a functional diagram illustrating a programmed computer system for network packet event related script execution in accordance with some embodiments. As will be apparent, other computer system architectures and configurations can be used to determine network packet event related script execution. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide server functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
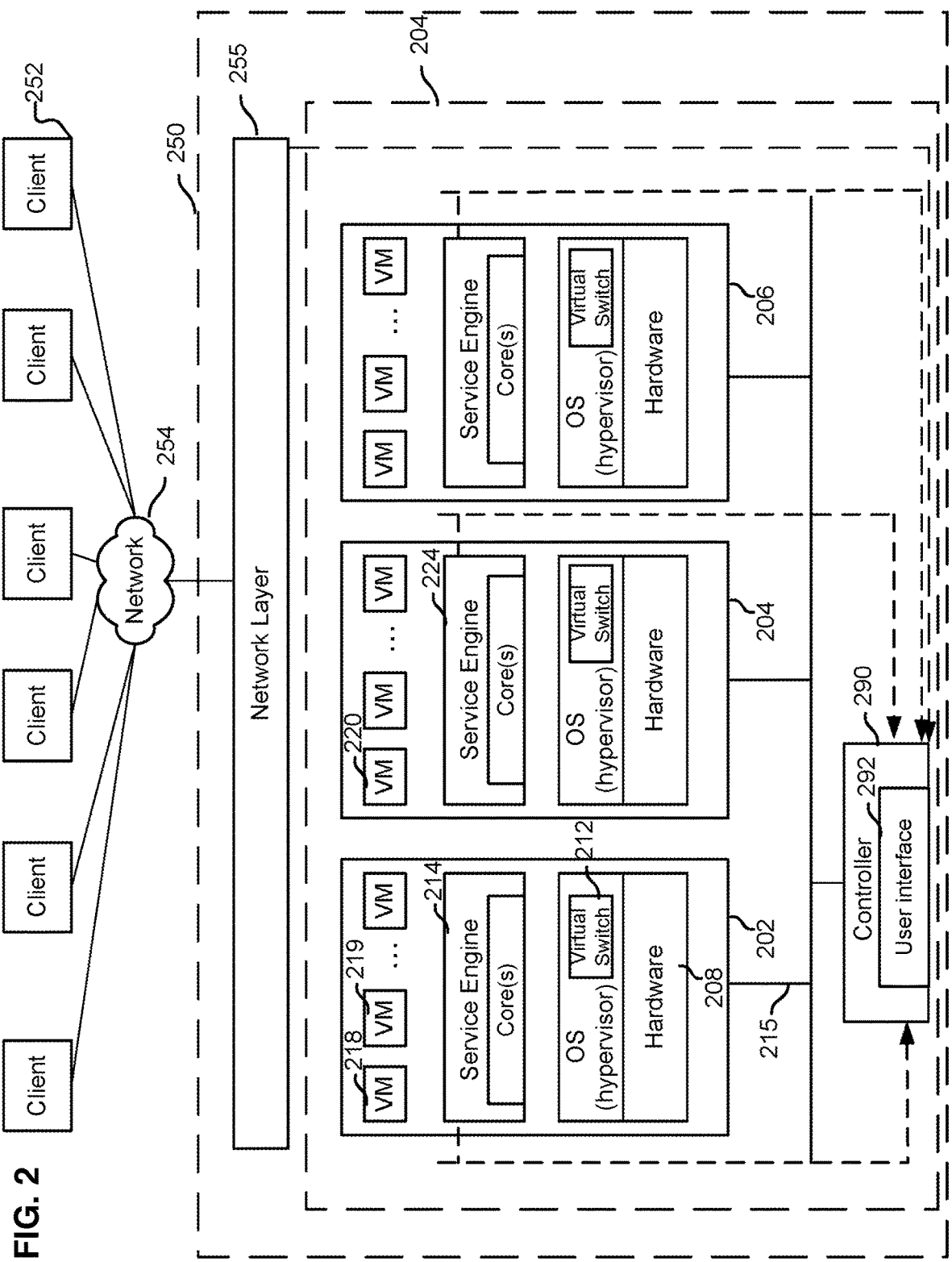
FIG. 2 is a block diagram illustrating an embodiment of a data center that performs network packet event related script execution.

FIG. 2 is a block diagram illustrating an embodiment of a data center that performs network packet event related script execution. In this example, client devices such as 252 connect to a data center 250 via a network 254. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain applications hosted by data center 250. Network 254 can be the Internet, a private network, a hybrid network, or any other communications network.

In the example shown, a networking layer 255 comprising networking devices such as routers, switches, etc. forwards requests from client devices 252 to a distributed network service platform 204. In this example, distributed network service platform 204 includes a number of servers configured to provide a distributed network service. A physical server (e.g., 202, 204, 206, etc.) has hardware components and software components, and may be implemented using a device such as 100. In this example, hardware (e.g., 208) of the server supports operating system software in which a number of a virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. Hypervisor 208 interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architectures are shown and discussed extensively for purposes of example, physical servers supporting other architectures such as container-based architectures (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute within the VMs. Examples of such applications include web applications such as shopping cart, user authentication, credit card authentication, email, file sharing, virtual desktops, voice/video streaming, online collaboration, and many others.

One or more service engines (e.g., 214, 224, etc.) are instantiated on a physical device. In some embodiments, a service engine is implemented as software executing in a virtual machine. The service engine is executed to provide one or more distributed virtual services for applications executing on the same physical server as the service engine, and/or for applications executing on different physical servers. In some embodiments, the service engine is configured to enable appropriate service components that implement service logic. For example, a load balancer virtual service is executed to provide load balancing logic to distribute traffic load amongst instances of applications executing on the local physical device as well as other physical devices; a firewall virtual service is executed to provide firewall logic to instances of the applications on various devices; a metrics agent virtual service is executed to gather metrics associated with traffic, performance, etc. associated with the instances of the applications, etc. Many other virtual services may be implemented and enabled as appropriate. When a specified virtual service is desired, a corresponding virtual service component is configured and invoked by the service engine to execute in a VM, in some embodiments. In some embodiments, a virtual service is configured to provide a converged set of multiple virtual services (e.g., a combination of a firewall, load balancer, and metrics analytics).

Each service engine (e.g., 214, 224, etc.) includes one or more cores. In various embodiments, a "core" comprises a processor (e.g., a Central Processing Unit (CPU)). A core may be implemented using a virtual machine or a physical CPU. For example, the one or more cores of a service engine may belong to a multi-core processor.

In the example shown, traffic received on a physical port of a server (e.g., a communications interface such as Ethernet port 215) is sent to a virtual switch (e.g., 212). In some embodiments, the virtual switch is configured to use an API provided by the hypervisor to intercept incoming traffic designated for the application(s) in an inline mode, and send the traffic to an appropriate service engine. In inline mode, packets are forwarded on without being replicated. As shown, the virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server. Details of the virtual switch and its operations are outside the scope of the present application.

Controller 290 is configured to control, monitor, program, and/or provision the distributed virtual services and virtual machines. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

As will be described in further detail below, during configuration time, controller 290 is configured to receive, via user interface 292, definitions of script objects to be associated with a script object model. In various embodiments, each script object is defined to include at least one script to be executed, during runtime, in response to at least one detected event associated with a network packet that is received at a service engine that is implementing a virtual service. Further during configuration time, controller 290 is configured to receive, via user interface 292, one or more sets of virtual service configuration information. Each set of virtual service configuration information corresponds to a specified virtual service, where each set of virtual service configuration information identifies one or more script objects from the script object model, and a sequence order in which the script objects are to be executed. The scripts that are identified in the set of virtual service configuration information associated with a virtual service can be executed to perform one or more functions associated with that virtual service. Each set of virtual service configuration information corresponding to a specified virtual service further includes other information associated with a specified virtual service (e.g., an Internet Protocol (IP) address and/or one or more port values). Controller 290 is configured to send the corresponding set of virtual service configuration information for a specified virtual service to at least one service engine (e.g., 214, 224, etc.) to cause the at least one service engine to implement the specified virtual service.

As will be described in further detail below, during configuration time, a service engine that receives a set of virtual service configuration information corresponding to each specified virtual service is configured to store separate event context information based on the respective sets of virtual service configuration information in its shared memory. During runtime, when the service engine is actively implementing the virtual service(s) and receiving network packets, the SEDP processes executing at corresponding ones of the cores of the service engine are configured to identify a virtual service to which each network packet is directed, detect events associated with the received network packets, and access the event context information associated with the applicable virtual services in the shared memory to execute the relevant scripts associated with each detected event.

The components and arrangement of distributed network service platform 204 described above are for purposes of illustration only.

Figure 3:
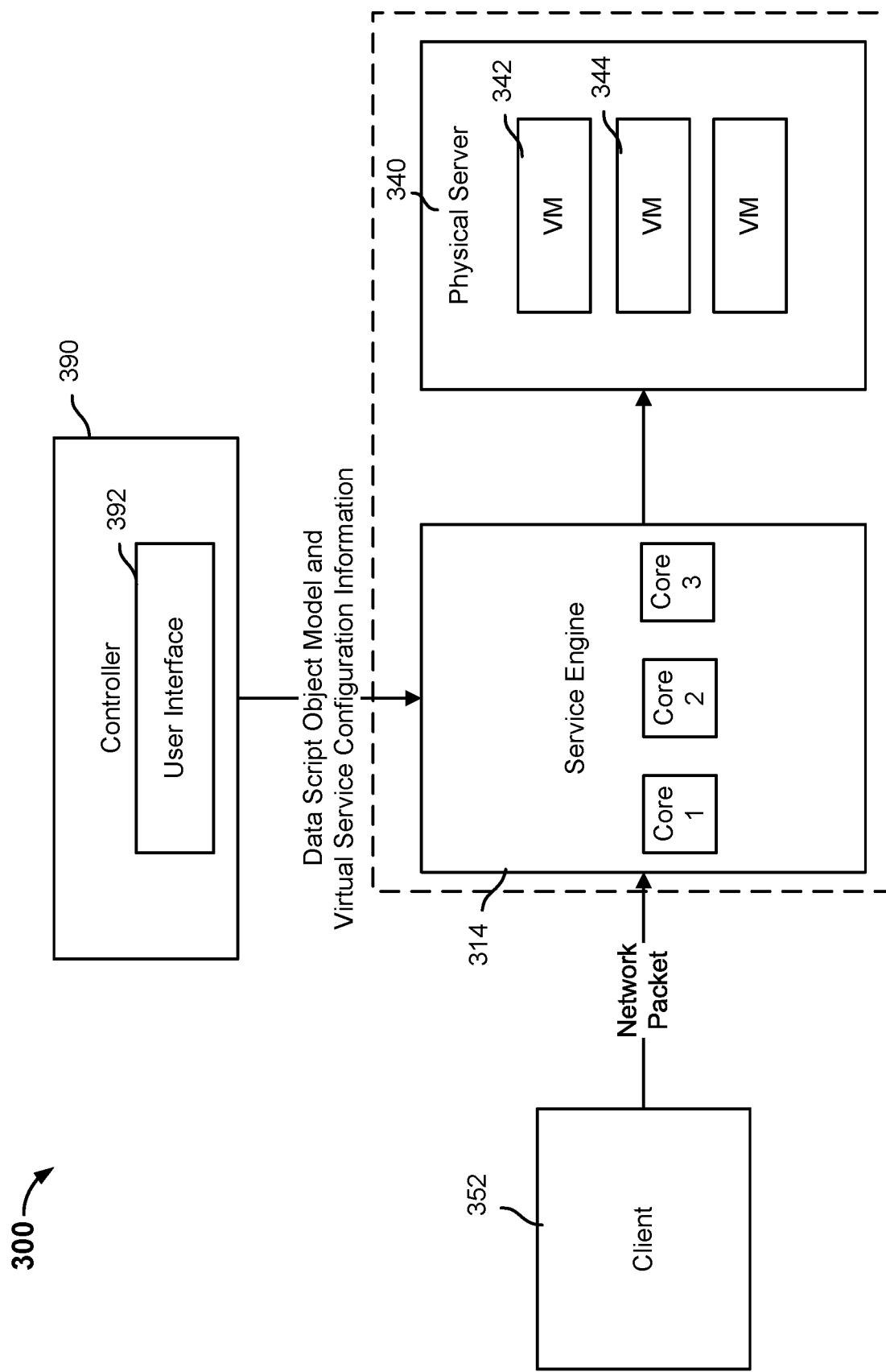
FIG. 3 is a block diagram illustrating an embodiment of a system for network packet event related script execution.

FIG. 3 is a block diagram illustrating an embodiment of a system for network packet event related script execution. System 300 comprises controller 390, client 352, service engine 314, and physical server 340. In some embodiments, controller 290 of FIG. 2 may be implemented using controller 390. In some embodiments, client 252 of FIG. 2 may be implemented using client 352. In some embodiments, service engine 214 of FIG. 2 may be implemented using service engine 314.

During configuration time, user interface 392 of controller 390 is configured to receive definitions for script objects to be associated with a script object model. In various embodiments, each script object is defined to include at least one script to be executed, during runtime, in response to at least one detected event associated with a network packet that is received at the service engine (e.g., service engine 314) that is implementing a virtual service. In some embodiments, controller 390 is configured to precompile each script object. In some embodiments, precompiling each script object includes detecting syntax errors associated with the script object definitions. In some embodiments, precompiling each script object includes detecting syntax errors associated with the script object definitions comprising applying transformations on the script objects to map user defined constructs to system specific constructs. For example, applying transformations on the script objects to map user defined constructs to system specific constructs may include mapping user readable names related to a pool of servers to system specific universal unique identifiers (UUIDs) associated with the pool of servers. As such, script objects can be centrally created and updated at controller 390 so that new or changed script objects can be centrally propagated to all the affected virtual services because the script object model to which they belong can be shared among multiple virtual services.

The script object model is usable to configure one or more virtual services. Put another way, the script object model can be shared across multiple virtual services. In various embodiments, also during configuration time, user interface 392 of controller 390 is configured to receive a set of virtual service configuration information associated with each corresponding specified virtual service. Examples of a virtual service include a load balancer, a DNS server, and a firewall. Further during configuration time, controller 390 is configured to send the script object model to service engine 314.

In addition, controller 390 is configured to send to service engine 314 a "create virtual service" message corresponding to a specified virtual service. The "create virtual service" message includes a set of virtual service configuration information that corresponds to the specified virtual service. The set of virtual service configuration information corresponding to a virtual service identifies one or more script objects from the script object model to be associated with that virtual service and also a sequence in which those script objects are to be executed for that virtual service. The scripts that are identified in the set of virtual service configuration information associated with a virtual service can be executed to perform one or more functions associated with that virtual service. For example, if the specified virtual service associated with a set of virtual service configuration information were a firewall, then scripts identified in the set of virtual service configuration information can be executed to perform functions associated with a firewall, such as, for example, comparing a portion of a network packet against patterns of known malware. By facilitating the creation of a script object model that is agnostic to virtual services, the use of scripts to be executed in response to detected network packet events becomes more efficient and modular. As a script object needs only to be defined and/or updated at the script object model but that the changes can be propagated to all virtual services that employ the scripts of that object, the scripts that are used for virtual services become far less error-prone. The set of virtual service configuration information corresponding to the specified virtual service also includes additional information such as an IP address associated with the virtual service, a port associated with the virtual service, and a profile associated with the virtual service, for example.

In response to receiving a set of virtual service configuration information for the corresponding specified virtual service, service engine 314 (or a process executing thereon, which is sometimes referred to as a "service engine agent") is configured to generate and store on a shared memory (not shown in FIG. 3) a set of event context information associated with the specified virtual service using the set of virtual service configuration information. As will be described in further detail below, the set of event context information associated with a specified virtual service includes information related to each event that is included in the script object(s) that are part of the set of virtual service configuration information corresponding to the specified virtual service. In some embodiments, the set of event context information corresponding to a specified virtual service includes for each event, the script(s) that are to be executed in response to a detection of such an event during runtime of service engine 314 implementing the specified virtual service. The script(s) that are identified for each event are across the one or more script objects that are included in the set of virtual service configuration information for the specified virtual service. It is possible that no scripts or empty scripts are identified for each of one or more events within the set of virtual service configuration information corresponding to a specified virtual service. For example, the set of event context information corresponding to a specified virtual service is implemented using an array or other data structure. In some embodiments, the set of event context information corresponding to a specified virtual service includes data that dictates, for each event, the sequence/order of the execution of scripts that are identified for that event. The sequence/order of the execution of scripts for a corresponding event is to occur in response to a detection of such an event during runtime of service engine 314 implementing the specified virtual service. In various embodiments, a process executing at service engine 314 is configured to allocate a respective portion of the memory at service engine 314 to be shared across all the cores of service engine 314. This "shared" portion of the memory service engine 314 is referred to as the "shared memory." In the example of FIG. 3, service engine 314 includes three cores, Cores 1, 2, and 3. Processes executing at any of Cores 1, 2, and 3 can access and read from the shared memory, while a process that is executing on a particular core is configured to only write to/store data to its core's corresponding allocation of the memory (the "per core memory," the "core specific memory," or the "SEDP process specific memory"). A core's corresponding allocation of the memory at the service is referred to as "per core memory," "core specific memory," or "SEDP process specific memory." Core specific memory is the memory available to a corresponding SEDP process that is running on the corresponding core. The core specific memory is specific to its corresponding SEDP process and is not accessed by other (e.g., SEDP) processes running on the other cores.

In response to receiving the "create virtual service" message, the service engine agent executing on service engine 314 is configured to send the "create virtual service" message and the corresponding set of virtual service configurations to each of Cores 1, 2, and 3 of service engine 314. In response to receiving the "create virtual service message" and the corresponding set of virtual service configurations, a respective process, which is sometimes referred to as a "service engine data path" (SEDP), that is executing at each of Cores 1, 2, and 3 is configured to generate a corresponding parent interpreter context corresponding to the specified virtual service in the corresponding core's per-core memory. "Per-core memory" is also sometimes referred to as the "core specific memory" herein. Given that there are Cores 1, 2, and 3 in service engine 314 of the example of FIG. 3, then there are three SEDPs executing at service engine 314, where a corresponding SEDP executes on each of Cores 1, 2, and 3. The respective SEDP that is executing on each corresponding core of service engine 314 is also configured to compute a handle/reference to its corresponding parent interpreter context corresponding to the specified virtual service and store the handle/reference in that core's memory (or, to the memory allocated by SEDP in its address space) of service engine 314. Furthermore, the respective SEDP that is executing on each corresponding core of service engine 314 is additionally configured to compute/access the event context information from the script object in the shared memory of service engine 314 to obtain the scripts pertaining to each event and then process the obtained scripts to generate a set of interpretable byte code (which is more immediately executable at runtime than the scripts themselves) corresponding to the event. The set of interpretable byte code corresponding to each event is stored in a data structure (e.g., a hash table) in the corresponding parent interpreter context of each core's core specific (or, memory available in the SEDP's address space) memory. In some embodiments, a (e.g., MD5) key (and/or other script specific information such as the script name and the length of the script) corresponding to each script that corresponds to that event is stored in the shared memory of service engine 314. At least the key corresponding to each script is usable to retrieve the set of interpretable byte code corresponding to that script from a parent interpreter context that is located in a core specific memory during runtime, as will be described in further detail below. In some embodiments, a single (e.g., MD5) key corresponding to each event is stored in the shared memory of service engine 314 and this single key is used to retrieve a set of interpretable byte code corresponding to the one or more scripts that are associated with the event from the parent interpreter context.

During runtime, service engine 314 is configured to implement the specified virtual service(s) for which service engine 314 had received corresponding set(s) of virtual service configuration information at configuration time. In the example of FIG. 3, service engine 314 implements the specified virtual service(s) in between client 352 and physical server 340. For example, physical server 340 is associated with a shopping platform and each of VMs 342 and 344 that is executing at physical server 340 is configured to perform a web service/application related to the shopping platform, such as a shopping cart, user authentication, credit card authentication, etc. In some embodiments, service engine 314 and physical server 340 may be implemented on one physical device. For example, if service engine 314 were implementing the virtual service of a firewall, service engine 314 would be configured to filter network traffic (e.g., network packets) between client 352 (among other clients) and physical server 340.

During runtime, service engine 314 is configured to receive network packets from clients such as client 352. Each network packet that is received at service engine 314 is distributed to an SEDP process that is implemented at a corresponding core of service engine 314. The recipient SEDP process determines a virtual service, for which a set of virtual service configuration information has been received at service engine 314, that should apply to the network packet based on comparing at least a portion (e.g., one or more fields) of the network packet to local sets of virtual service configuration information. For example, the SEDP process compares the destination IP address of the network packet to those in the sets of virtual service configuration information to determine matching virtual services. If a matching virtual service can be found, then the destination port of the network packet is compared to that of the matching virtual service. If the destination port matches, then the matching virtual service is determined by the SEDP process to be the applicable virtual service that is used to process the network packet.

After the SEDP process identifies an applicable virtual service for the network packet, then the SEDP process obtains from the shared memory at service engine 314 the handle to the parent interpreter context that corresponds to the applicable virtual service to invoke that parent interpreter context. The SEDP also determines one or more events that are related to the network packet. For each determined event, a corresponding child interpreter context (or, alternatively, a child co-routine or thread) is spawned from the parent interpreter context corresponding to the applicable virtual service. The child interpreter context and the parent interpreter context are both located in the core specific memory corresponding to the core on which the SEDP is run. For each detected event related to the network packet, the SEDP process is configured to access the shared memory to retrieve the (e.g., MD5) keys pertaining to the scripts(s) associated with the event and then use those key(s) to retrieve the set of interpretable byte code (e.g., closure factory wrapped scripts) that is stored within the hash table (or other data structure) that is stored in the parent interpretable context corresponding to the applicable virtual service. In a specific example, if the received network packet is a TCP SYN packet, then the detected event is TCP_SYN and the set(s) of interpretable byte code associated with the one or more scripts that are associated with this event are obtained from the hash table in the parent interpreter context. The retrieved set(s) of interpretable byte code are executed in the parent interpreter context and the resulting interpretable byte code (e.g., closures) is moved from the parent interpreter context to the child interpreter context, while maintaining the sequence of the scripts pertaining to the event as was dictated in the set of virtual service configuration information corresponding to the applicable virtual service. The moved interpretable byte code (e.g., closures) corresponding to the event is then executed in the child interpreter context of the core specific memory. By executing the interpretable byte code that is derived from the scripts that pertain to a certain event related to a network packet in a child interpreter context (versus the parent interpreter context) in the core specific memory of the core that is handling the network packet, any fatal crash during runtime execution of the scripts is isolated from the parent interpreter context, which houses the interpretable byte code of all the events. This arrangement provides a per network packet or per request execution isolation environment.

In addition to the per network packet or per request execution isolation environment, various embodiments described herein provide isolation between different cores at a service engine. Cores process network packets that are received at the service engine in parallel yet any crashes that occur with respect to a core (e.g., in its core specific memory) do not affect the virtual service processing performed by any other core at the same service engine. Furthermore, various embodiments described herein provide isolation between different service engines that are providing the same virtual service because any faults in the virtual service processing by one service engine do not affect the virtual service processing performed by any other service engine. As such, the script object model can be shared among multiple virtual services while isolation may still be maintained at the service engine, core, and network packet levels.

In some embodiments, any runtime exception in a child interpreter context is captured to generate a stack trace. The stack trace is pushed as a log message bound to the virtual service to controller 390. The log is visually available for debugging purposes at user interface 392 of controller 390, in some embodiments.

In some embodiments, two memory pool types are configured in service engine 314, where one memory pool (e.g., which is sometimes referred to as the "SCRIPT_MEMTYPE_CONFIG") is dedicated for the configuration setup and the other memory pool (e.g., which is sometimes referred to as the "SCRIPT_MEMTYPE_RUNTIME") is dedicated for the runtime script execution. Before any operation is performed using any SEDP process at service engine 314, memory of SCRIPT_MEMTYPE_CONFIG is used to perform configuration time setup. For example, configuration time setup includes the SEDP processes generating a parent interpreter context corresponding to each virtual service (e.g., via an API call to use the SCRIPT_MEMTYPE_CONFIG) that is to be provided by service engine 314 and the handles to such parent interpreter contexts. Also, for example, performing configuration time setup further includes generating interpretable byte code corresponding to each event corresponding to a virtual service and storing such code in (e.g., a data structure such as a hash table) the parent interpreter context corresponding to that virtual service. Once all configuration time setup is completed and a full garbage collection is performed on the SCRIPT_MEMTYPE_CONFIG memory, the parent interpreter context is set to use the memory from the pool SCRIPT_MEMTYPE_RUNTIME (e.g., via an API call). When child interpreter context is created, it is set to perform runtime execution using SCRIPT_MEMTYPE_RUNTIME memory. For example, runtime execution includes receiving a network packet and using an SEDP process at a core of service engine 314 to apply an applicable virtual service to the network packet. In some embodiments, memory for both memory pool types comprises core specific memories in service engine 314.

Figure 4:
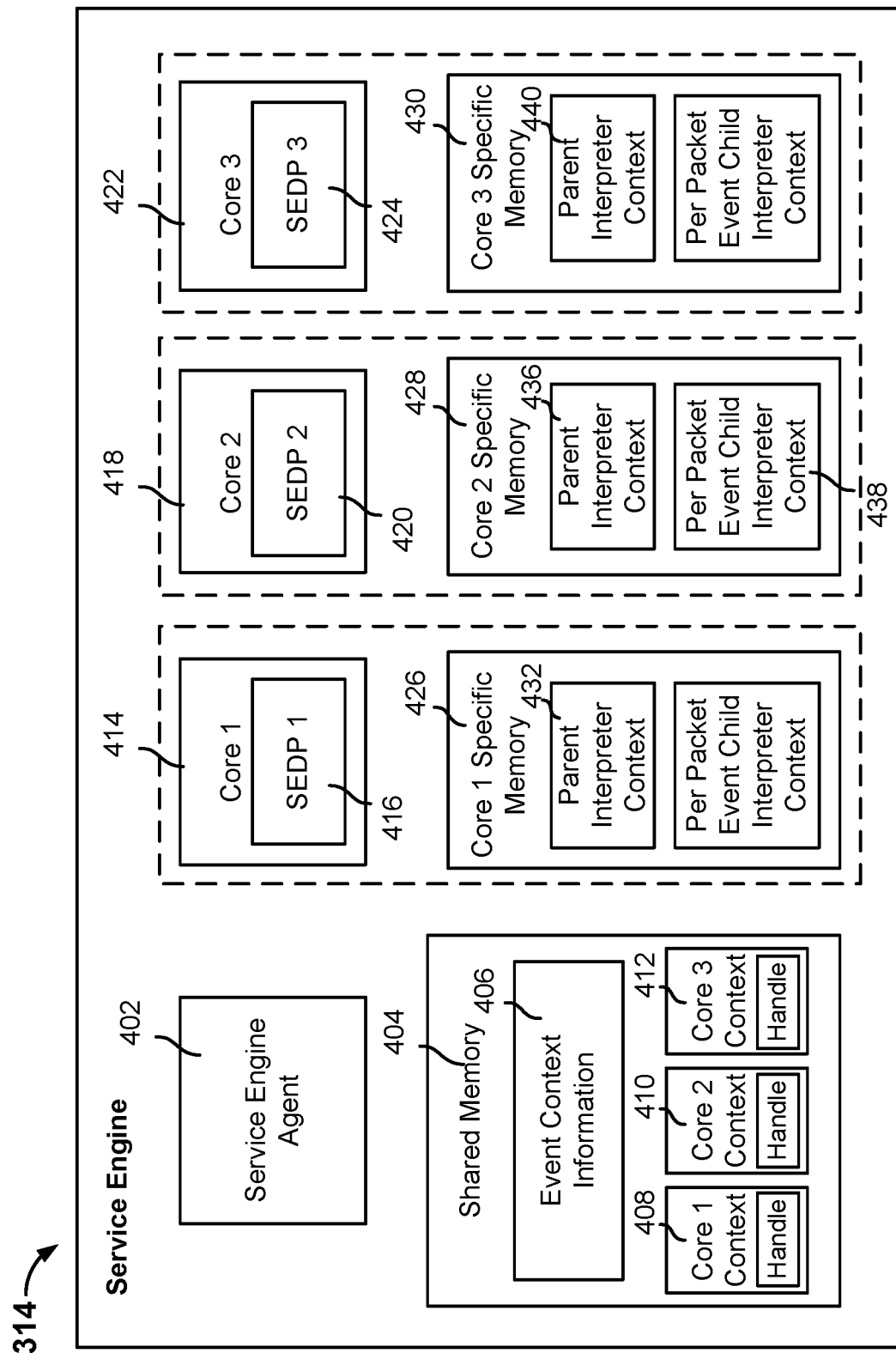
FIG. 4 is a block diagram illustrating an embodiment of a service engine.

FIG. 4 is a block diagram illustrating an embodiment of a service engine. In some embodiments, service engine 314 of system 300 of FIG. 3 may be implemented using the example of FIG. 4. The example service engine of FIG. 4 includes service engine agent 402, Core 1 (414), Core 2 (418), Core 3 (422), shared memory 404, Core 1 specific memory (426), Core 2 specific memory (428), and Core 3 specific memory (430). Each of Cores 1, 2, and 3 may be implemented using a physical processor (e.g., CPU) or a virtual processor (e.g., vCPU). While the example service engine of FIG. 4 includes three cores, in practice, a service engine may include more or fewer cores.

Service engine agent 402 comprises a process that is configured to communicate with a controller (not shown) to enable the service engine to implement one or more virtual services. During configuration time, service engine agent 402 is configured to receive, from the controller, a script object model and also, at the same or a separate time, a "create virtual service" message for a specified virtual service that includes a set of virtual service configuration information corresponding to the specified virtual service from the controller. In some embodiments, the script object model is stored at shared memory 404. In some embodiments, each set of virtual service configuration information is stored at both shared memory 404 and each per-core memory (426, 428, and 430). As mentioned above, in various embodiments, the set of virtual service configuration information corresponding to a specified virtual service identifies one or more script objects from the script object model. The scripts that are identified in the set of virtual service configuration information associated with a virtual service can be executed to perform one or more functions associated with that virtual service. Service engine agent 402 is configured to determine, across the one or more script objects that are identified in a set of virtual service configuration information corresponding to a specified virtual service, zero or more script objects that are related to each event that appears within the set of virtual service configuration information. Service engine agent 402 is configured to create a corresponding event context information 406 in shared memory 404 based on each set of virtual service configuration information corresponding to a specified virtual service. In some embodiments, service engine agent 402 is configured to store in event context information 406 corresponding to a specified virtual service data, as determined based on the corresponding set of virtual service configuration information, that identifies which scripts pertain to each event, a sequence in which the scripts that pertain to each event should be executed during runtime, and also a (e.g., MD5) key that corresponds to each event. For example, the key that corresponds to each event is derived by service engine agent 402 based on at least a portion of the scripts that correspond to that event. In some embodiments, service engine agent 402 generates an MD5 key for each script associated with a specified virtual service and SEDP processes of the service engine access the same set of MD5 keys associated with the scripts that are associated with each specified virtual service. For example, the information pertaining to scripts of event context information 406 corresponding to a specified virtual service are stored in an array, where each element of the array stores the information related to a different event that was identified from the set of virtual service configuration information.

During configuration time, service engine agent 402 is configured to create a corresponding allocation in shared memory 404 for each core of the service engine, Core 1, Core 2, and Core 3, that are shown, respectively, as Core 1 context (408), Core 2 context (410), and Core 3 context (412). For example, the cores' corresponding allocations (e.g., Core 1 context, Core 2 context, Core 3 context) in shared memory 404 are implemented using an array (e.g., vector) where each assigned core value associated with each core corresponds to the index of the array to which the core's allocation belongs. In some embodiments, a separate such array is implemented at shared memory 404 for each different virtual service.

As mentioned before, a received "create virtual service" message for a specified virtual service includes a corresponding set of virtual service configuration information for the specified virtual service. Service engine 402 is configured to forward the "create virtual service" message to each of SEDP 1 (416), SEDP 2 (420), and SEDP 3 (424) that are executing respectively on Core 1, Core 2, and Core 3. In response to receiving the "create virtual service" message, each SEDP executing on a corresponding core of the service engine 314 is configured to create a corresponding parent interpreter context corresponding to the specified virtual service identified by the message in the core's specific memory. Specifically, in the example of FIG. 4, SEDP 1 is configured to generate parent interpreter context 432 corresponding to the specified virtual service identified by the message in Core 1 specific memory 426, SEDP 2 is configured to generate parent interpreter context 436 corresponding to the specified virtual service identified by the message in Core 2 specific memory 428, and SEDP 3 is configured to generate parent interpreter context 440 corresponding to the specified virtual service identified by the message in Core 3 specific memory 430. Furthermore, SEDP 1 is configured to store a generated handle/pointer/reference to its parent interpreter context 432 corresponding to the specified virtual service identified by the message in Core 1 context for the virtual service in shared memory 404, SEDP 2 is configured to store a generated handle/pointer/reference to its parent interpreter context 436 corresponding to the specified virtual service identified by the message in Core 2 context for the virtual service in shared memory 404, and SEDP 3 is configured to store a generated handle/pointer/reference to its parent interpreter context 440 corresponding to the specified virtual service identified by the message in Core 3 context for the virtual service in shared memory 404. Unlike shared memory 404, which is accessible by the processes (e.g., SEDPs) executing at all of Cores 1, 2, and 3, each core specific memory is only accessible by the processes that are executing on its corresponding core. Each respective SEDP executing at a corresponding core of the service engine is configured to generate a set of interpretable byte code (e.g., closure factory wrapped scripts) from each script that has been identified for each event from the set of virtual service configuration information for the specified virtual service. In various embodiments, the respective SEDP process executing at each of Cores 1, 2, and 3 is configured to use event context information 406 corresponding to the specified virtual service identified by the message stored in shared memory 404 to identify the zero or more scripts that are related to each event that is identified in the set of virtual service configuration information. In some embodiments, the SEDP process executing at each of Cores 1, 2, and 3 is configured to wrap each script that is related to each event in a corresponding closure factory to generate closure factory wrapped scripts, which is a set interpretable byte code.

Then, the respective SEDP process executing at each of Cores 1, 2, and 3 is configured to store the set of interpretable byte code corresponding to each event with the (e.g., MD5) key corresponding to each script in a corresponding data structure (e.g., hash table) within the parent interpreter context corresponding to the specified virtual service in its corresponding core specific memory. Put another way, SEDP 1 is configured to wrap the script(s) associated with each event and store the closure factory wrapped script(s) into a corresponding hash table in parent interpreter context 432 corresponding to the specified virtual service of Core 1 specific memory, SEDP 2 is configured to wrap the script(s) associated with each event and store the closure factory wrapped script(s) into a corresponding hash table in parent interpreter context 436 corresponding to the specified virtual service of Core 2 specific memory, and SEDP 3 is configured to wrap the script(s) associated with each event and store the closure factory wrapped script(s) into a corresponding hash table in parent interpreter context 440 corresponding to the specified virtual service of Core 3 specific memory.

A "closure" is a record storing a function together with an environment. Closures makes functions a first class variable in programming languages and can be used as any other variables are used. In some embodiments, closures are generated for each event because a closure creates a function which can be called for execution. Since the scripts that are submitted (e.g., by a user) to a script object model may not be a callable function, each script must be transformed into a callable function before it can be executed during runtime. Thus, by wrapping up the script in a closure, the script can be called as a function at runtime. The reason that the script has to be callable has to do with the interpreter—the API (which executes the script) exposed by the interpreter expects the script to be a callable function. A closure factory is used to generate multiple instances of closures that are derived from scripts pertaining to an event. By using a closure factory to wrap scripts pertaining to each event, an instance of closures can be generated by the factory for each instance that the scripts pertaining to the event need to be executed (e.g., in a corresponding child interpreter context).

In some embodiments, because separate event context information and parent interpreter context handles associated with different cores are generated for each virtual service that the service engine is configured to provide, shared memory 404 may include multiple separate event context information and parent interpreter context handles corresponding to each such virtual service. For simplicity, the example service in FIG. 4 shows only event context information and parent interpreter context and their corresponding handles pertaining to one virtual service that is provided by the service engine.

During runtime, the service engine processes received network packets according to the specified virtual service(s) for which the respective set(s) of virtual service configuration information and "create virtual service" message(s) were previously received. The service engine implements the specified virtual service by at least using its cores to process network packets received at the service engine in parallel. In various embodiments, a network packet that is received at the service engine is distributed to one of Core 1, Core 2, and Core 3. The SEDP process executing on the core that had received the network packet associates the network packet with an applicable virtual service. The SEDP process compares the destination IP address of the network packet to those in the sets of virtual service configuration information to determine the matching virtual service. If a matching virtual service can be found, then the destination port of the network packet is compared to that of the matching virtual service. If the destination ports match, then the matching virtual service is determined by the SEDP process to be the applicable virtual service that is used to process the network packet. After the SEDP process identifies an applicable virtual service for the network packet, then the SEDP process obtains from shared memory 404 the handle to the parent interpreter context that corresponds to the applicable virtual service to invoke that parent interpreter context. The SEDP process also determines one or more events that are related to the network packet. For each determined event, a corresponding per network packet event child interpreter context (or, alternatively, a child co-routine or thread) is spawned from the parent interpreter context corresponding to the applicable virtual service. The child interpreter context and the parent interpreter context are both located in the core specific memory corresponding to the core on which the SEDP is run.

The SEDP process is configured to access event context information 406 in shared memory 404 corresponding to the applicable virtual service to obtain the corresponding (e.g., MD5) key(s) related to respective script(s) that are associated with a detected event and use the retrieved key(s) to locate in the data structure (e.g., hash table) that is stored in its corresponding parent interpreter context corresponding to the applicable virtual service in its core specific memory the closure factory wrapped scripts (set of interpretable byte code) corresponding to that event. The SEDP process will execute the retrieved closure factory wrapped scripts (set of interpretable byte code) corresponding to that event in the parent interpreter context to generate closures (another set of interpretable byte code). The closures corresponding to the event are moved from the parent interpreter context to the per packet event child interpreter context in the core specific memory and then executed in the per packet event child interpreter context in the sequence that they are to be executed in accordance to the information stored in event context information 406 corresponding to the applicable virtual service in shared memory 404. In some embodiments, if there is more than one event associated with a network packet, then the scripts corresponding to each event are executed in a corresponding per packet event child interpreter context.

In various embodiments, at any given time for a network packet under processing, only one event is being considered (i.e., there is no parallelism for packet processing on a core). Thus, at any given time only one child interpreter context is active for a network packet that is received at a core. For example, a DNS protocol packet generates two events, the UDP_PACKET_RECEIVED event as well as the DNS_REQUEST_RECEIVED event (since the DNS application comes in a UDP packet). One or more scripts may be executed in one child interpreter context for the UDP_PACKET_RECEIVED event and one or more scripts may be executed in another child interpreter context for the DNS_REQUEST_RECEIVED event, depending on what is dictated in the set of virtual service configuration information corresponding to the virtual service that is determined to be applicable to the DNS protocol packet.

In various embodiments, a per event child interpreter context is garbage collected when it has either successfully executed all the scripts for the given event or it has crashed while executing the scripts. The per event child interpreter context is garbage collected in the parent interpreter context.

Different cores of the service engine may be processing different network packets and at the same time, all the cores may be executing scripts for different events related to their respective network packets.

The following is a specific example of runtime network packet related event execution with respect to FIG. 4: a network packet that is distributed to Core 2 causes SEDP 420 to determine that a particular virtual service that is provided by the service engine is applicable to the network packet. SEDP 420 invokes the parent interpreter corresponding to that applicable virtual service (that can execute the script), parent interpreter context 436, to spawn a child interpreter context, child interpreter context 438, to execute scripts corresponding to an event associated with the network packet. Examples of events include when a transmission control protocol (TCP) handshake is completed, when a domain name system (DNS) query is received, and when a response to a DNS query is received. For each event that is determined from the network packet by SEDP 420, SEDP 420 retrieves corresponding (e.g., MD5) key(s) corresponding to the script(s) that are associated with that event from the event context information that corresponds to the applicable virtual service in shared memory 404. For each such event, the obtained corresponding key(s) are used to locate corresponding closure factory wrapped scripts that are stored in a data structure (e.g., hash table) in parent interpreter context 436 of Core 2 specific memory. Parent interpreter context 436 then executes the closure factory wrapped scripts to generate closures corresponding to the event. The closures corresponding to the event are then moved from parent interpreter context 436 to per packet event child interpreter context 438 and executed in per packet event child interpreter context 438. Because processes executing on one core cannot access the core specific memories of another core, there is isolation between event related script execution between network packets handled by different cores. Furthermore, since the execution happens in the child interpreter context, the parent interpreter context is always isolated from faults in the child interpreter context. Additionally, there is isolation across events related script execution that occurs on per packet event child interpreter contexts on the same core specific memory. As such, a parent child interpreter, which houses information that is important to the script execution for all network packets that are received at a corresponding core is safe from a crash or other undesirable event that occurs within a per packet event child interpreter within the same core specific memory.

In some embodiments, any runtime exception in a child interpreter context is captured to generate a stack trace and the stack trace is pushed as a log message bound to the virtual service to the controller. The log is visually available for debugging purposes at the controller. Furthermore, one of the benefits of this storing a (e.g., MD5) key corresponding to each script is that if one of these scripts crashes, the offending script is able to be pinpointed in the stack trace logs propagated to the user by virtue of the script's corresponding key that will be identified in the logs.

Figure 5:
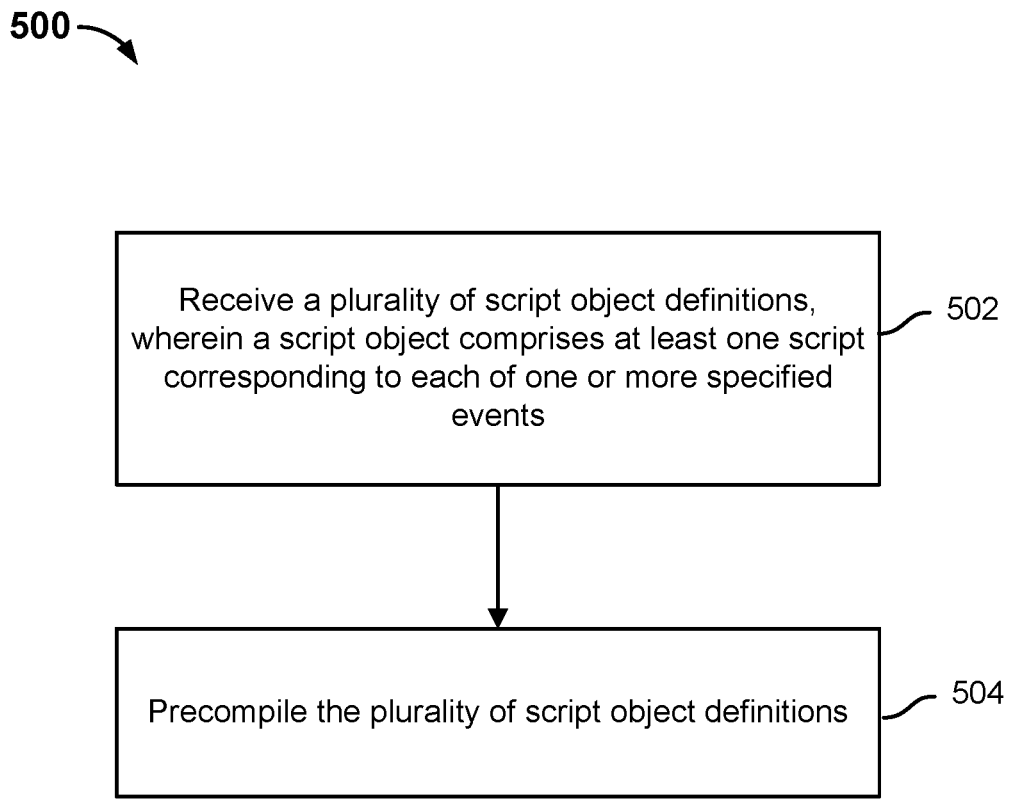
FIG. 5 is a flow diagram showing an embodiment of a process for receiving configurations of script objects.

FIG. 5 is a flow diagram showing an embodiment of a process for receiving configurations of script objects. In some embodiments, process 500 is implemented at controller 290 of FIG. 2 and controller 390 of FIG. 3 at configuration time.

At 502, a plurality of script object definitions is received, wherein a script object comprises at least one script corresponding to each of one or more specified events. In some embodiments, the script objects are manually configured. In various embodiments, one or more script objects are shared across one or more virtual services.

At 504, the plurality of script object definitions is precompiled. The script objects are precompiled to check for syntax errors and/or to map user defined constructs/names to system recognized/specific constructs/keys. Precompiling the script objects helps eliminate potential problems that might arise when the scripts therein are executed during runtime.

In various embodiments, script objects of the script object model may be updated during runtime in a manner that does not disrupt the virtual service processing of network packets at the service engine. For example, an update can be performed to the script object model (e.g., at the user interface of the controller) (e.g., the update being the addition of a new script to a specified event, the modification of an existing script, or the deletion of an existing script associated with an event) such that newer network packets start to see the update to the script object model. At this point, it is possible for some old network packets on some cores of the service engine to continue to use the old script object(s) even when newer network packets start to use the newer script object(s) on some other cores of the service engine.

Figure 6:
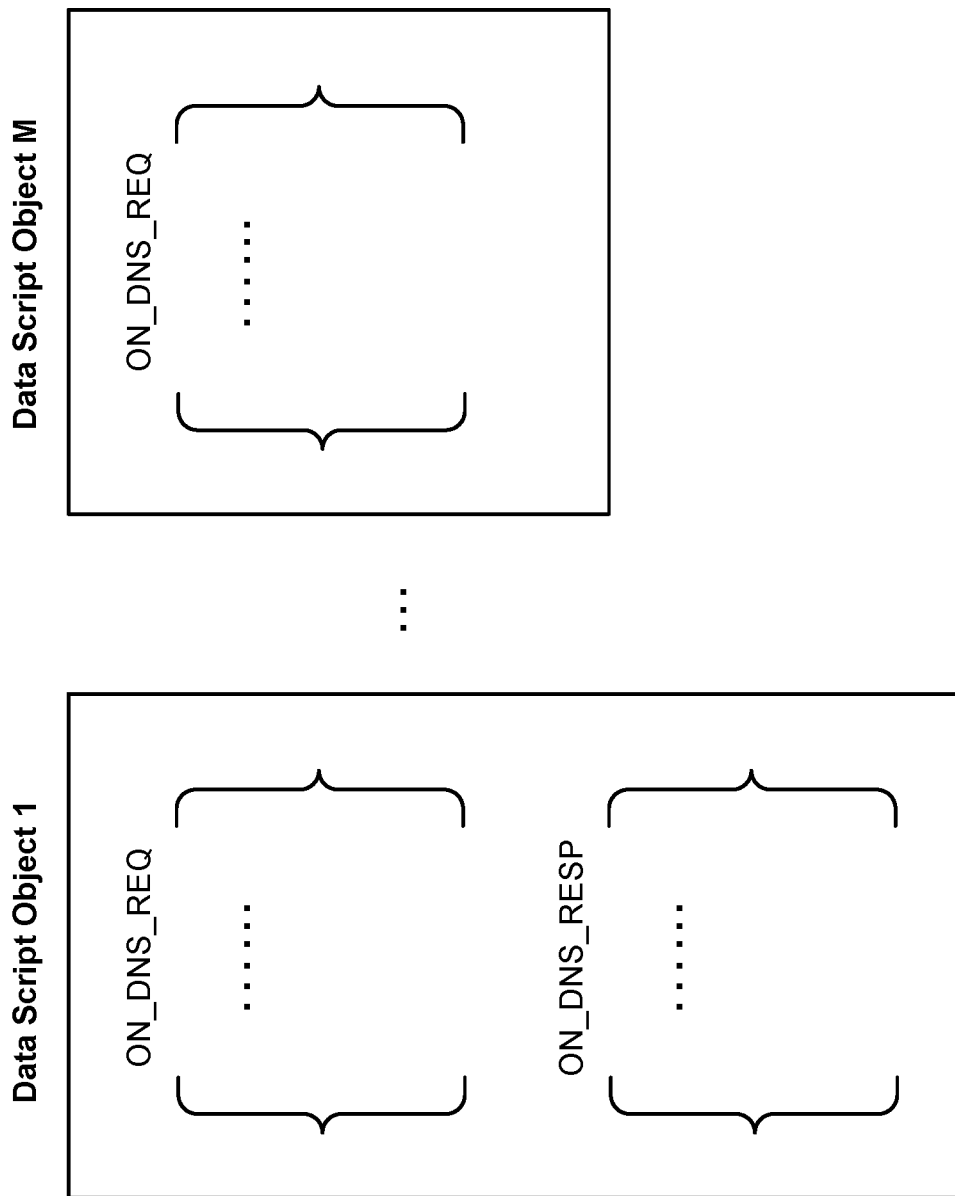
FIG. 6 is a diagram showing example script objects.

FIG. 6 is a diagram showing example script objects. In the example of FIG. 6, script object 1 includes a script defined for event "ON_DNS_REQ" (when a DNS query is received) and a script defined for event "ON_DNS_RESP" (when a DNS query response is received). Script object M includes another script defined for event "ON_DNS_REQ" (when a DNS query is received). For example, for event "ON_DNS_REQ," a corresponding script, when executed, may generate the response for the DNS query—e.g., the DNS query is for the IPv4 address (or a record) for the domain name www.avinetworks.com, and the script would generate a DNS response with the IPv4 address of the domain.

Figure 7:
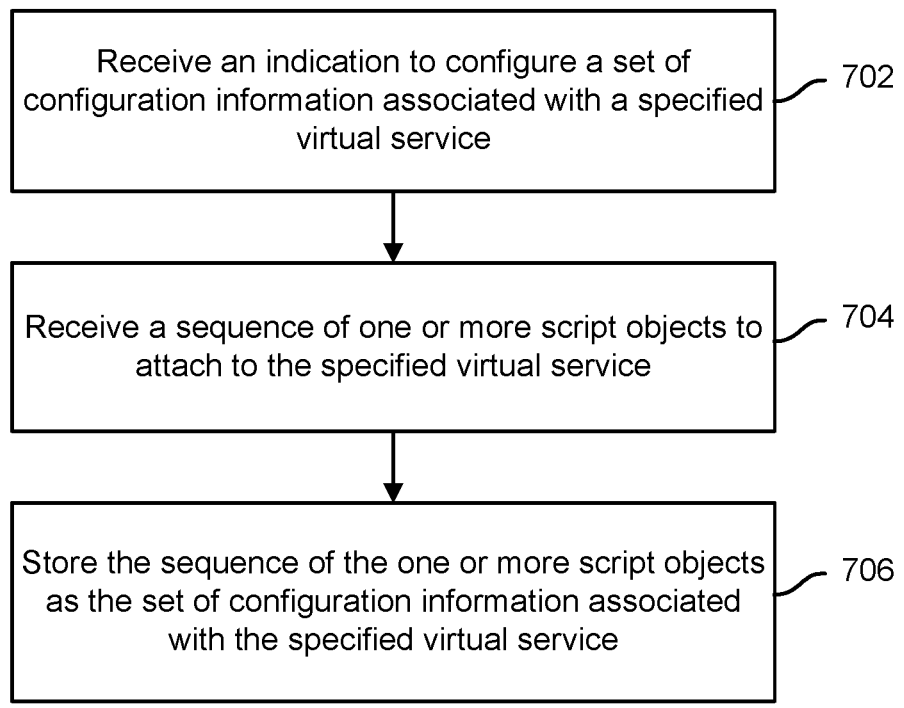
FIG. 7 is a flow diagram showing an embodiment of a process for receiving a set of virtual service configurations.

FIG. 7 is a flow diagram showing an embodiment of a process for receiving a set of virtual service configurations. In some embodiments, process 700 is implemented at user interface 292 of controller 290 of FIG. 2 or user interface 392 of controller 390 of FIG. 3 at configuration time.

At 702, an indication to configure a set of configuration information associated with a specified virtual service is received.

At 704, a sequence of one or more script objects to attach to the specified virtual service is received.

At 706, the sequence the of one or more script objects is stored as the set of configuration information associated with the specified virtual service.

Figure 8:
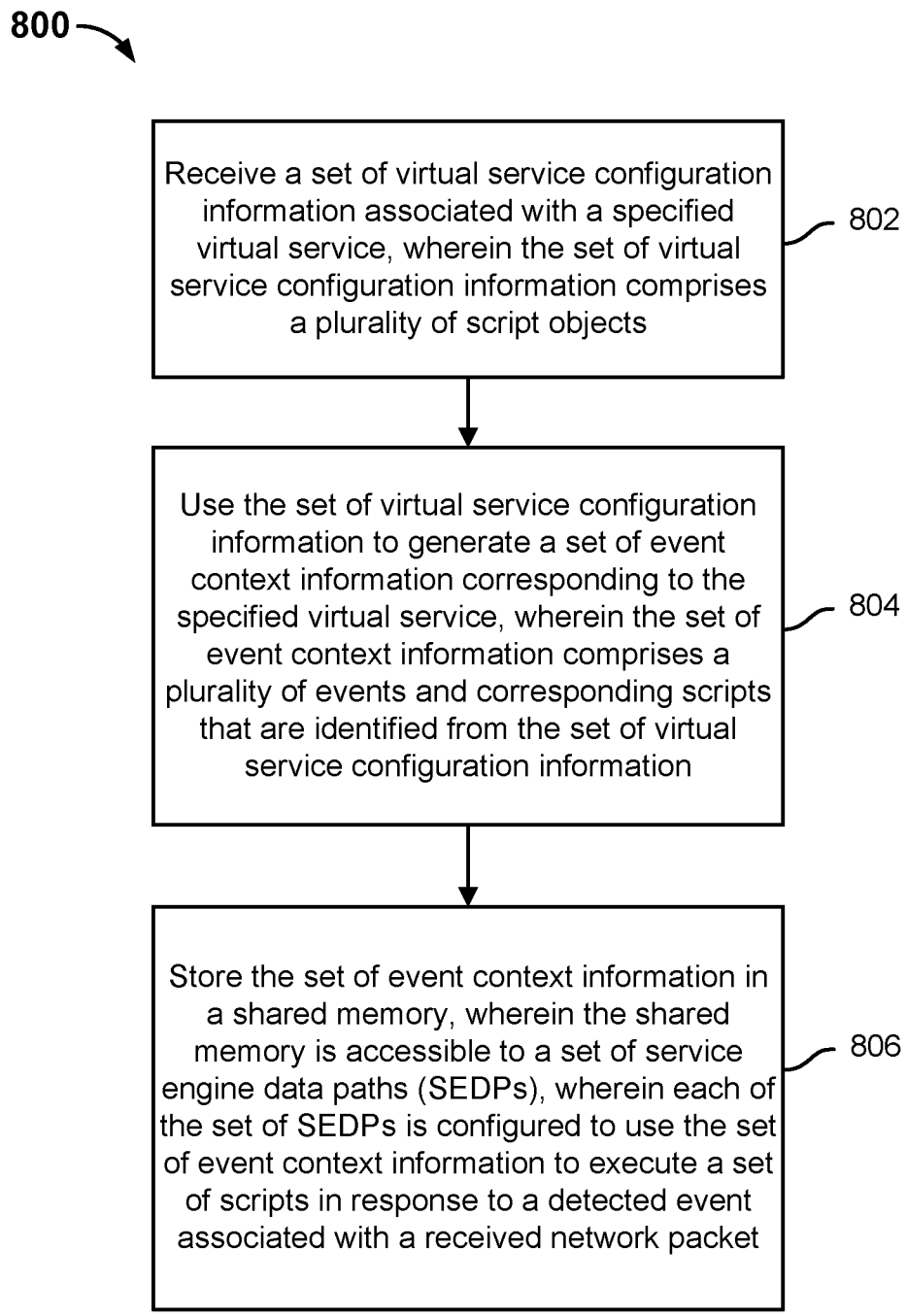
FIG. 8 is a flow diagram showing an embodiment of a process for configuring network packet event related script execution during configuration time.

FIG. 8 is a flow diagram showing an embodiment of a process for configuring network packet event related script execution during configuration time. In some embodiments, process 800 is implemented at service engine 214 of FIG. 2 or service engine 314 of FIG. 3 at configuration time. In some embodiments, process 800 is implemented at the example service engine of FIG. 4.

At 802, a set of virtual service configuration information associated with a specified virtual service is received, wherein the set of virtual service configuration information identifies a plurality of script objects. In various embodiments, the set of virtual service configuration information identifies one or more script object models. The script objects that are identified in the set of virtual service configuration information associated with a virtual service can be executed to perform one or more functions associated with that virtual service. In some embodiments, the set of virtual service configuration information was configured using a process such as process 700 of FIG. 7. In various embodiments, the set of virtual service configuration information also identifies a sequence/order in which the script objects should be executed for the specified service. In various embodiments, a script object includes one or more scripts to be executed in response to the detection of each of one or more events. In a script object, it is possible to have an event be associated with an empty script. Examples of scripting languages that may be used to configure the scripts include Lua, Python, Javascript, and any other scripting language that provides support for closures.

At 804, the set of virtual service configuration information is used to generate a set of event context information corresponding to the virtual service, wherein the set of event context information comprises a plurality of events and corresponding scripts that are identified from the set of virtual service configuration information. In various embodiments, the set of event context information identifies for each event that is identified across the script object(s) of the set of virtual service configuration information, the relevant scripts that are included in the script object(s) of the set of virtual service configuration information. In various embodiments, the set of event context information also identifies the sequence/order in which the relevant scripts are to be executed for each event. In some embodiments, the set of event context information is generated by a service engine agent (e.g., service engine agent 402 of FIG. 4) executing at the service engine.

At 806, the set of event context information is stored in a shared memory, wherein the shared memory is accessible to a set of service engine data paths (SEDPs), wherein each of the set of SEDPs is configured to use the set of event context information to execute a set of scripts in response to a detected event associated with a received network packet. The set of event context information is stored at a shared memory, which is accessible to respective SEDP processes executing at corresponding cores of the service engine. During runtime, where the service engine is configured to implement the specified virtual service, the SEDPs are configured to access the set of event context information at the shared memory to execute scripts relevant to each event that is related to network packets directed to the specified virtual service.

Figure 9:
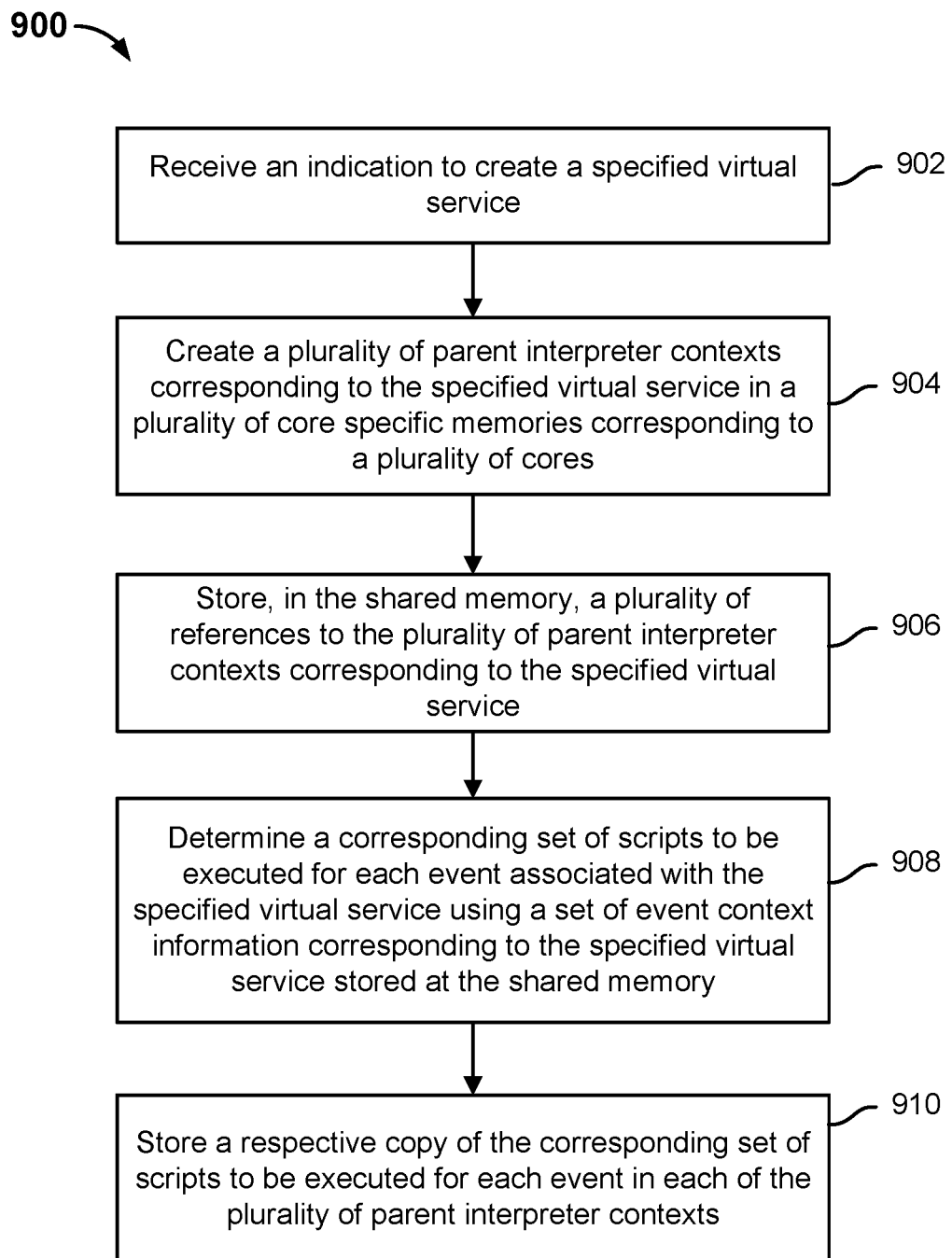
FIG. 9 is a flow diagram showing an embodiment of a process for creating a service engine based on a set of virtual service configurations.

FIG. 9 is a flow diagram showing an embodiment of a process for creating a service engine based on a set of virtual service configurations. In some embodiments, process 900 is implemented at service engine 214 of FIG. 2 and service engine 314 of FIG. 3 at configuration time. In some embodiments, process 900 is implemented at the example service engine of FIG. 4.

In some embodiments, process 900 is executed after and/or concurrently when the service engine receives a set of virtual service configuration information for a specified virtual service. For example, process 900 may be executed after the execution of process 800 of FIG. 8.

At 902, an indication to create a specified virtual service is received. In various embodiments, a "create virtual service" message for a specified virtual service for which the service engine has concurrently received a corresponding set of virtual service configuration information is received from a controller.

At 904, a plurality of parent interpreter contexts corresponding to the specified virtual service is created in a plurality of core specific memories corresponding to a plurality of cores. In various embodiments, each SEDP is configured to generate a corresponding parent interpreter context corresponding to the specified virtual service in the core specific memory that corresponds to the core of the service engine on which it is executing.

At 906, a plurality of references to the plurality of parent interpreter contexts corresponding to the specified virtual service is stored in a shared memory. Each corresponding SEDP stores a handle/pointer/reference to its corresponding parent interpreter context corresponding to the specified virtual service in the shared memory at the service engine.

At 908, a corresponding set of scripts to be executed for each event associated with the specified virtual service is determined using a set of event context information corresponding to the specified virtual service stored at the shared memory. In various embodiments, the set of event context information corresponding to the specified virtual service is derived from the set of virtual service configuration information for the specified virtual service and includes data describing which scripts are associated with each event that appears within the set of virtual service configuration information.

At 910, a respective copy of the corresponding set of scripts to be executed for each event is stored in each of the plurality of parent interpreter contexts. A separate copy of a set of scripts that has been identified to be executed for each event that is detected at runtime is stored in a data structure (e.g., hash table) in each parent interpreter context corresponding to the specified virtual service that is located in each core specific memory at the service engine. In some embodiments, the copy of the set of scripts that has been identified to be executed for each event is stored as closure factory wrapped scripts, and additionally the generated closure factory can be in the interpretable byte code form, in a data structure in each parent interpreter context corresponding to the specified virtual service. During runtime, when the service engine is implementing the specified virtual service, an SEDP process executing at each core is configured to obtain from the corresponding parent interpreter context and execute the stored set of scripts for an event when that event is detected with respect to a network packet that is received at that core.

Figure 10:
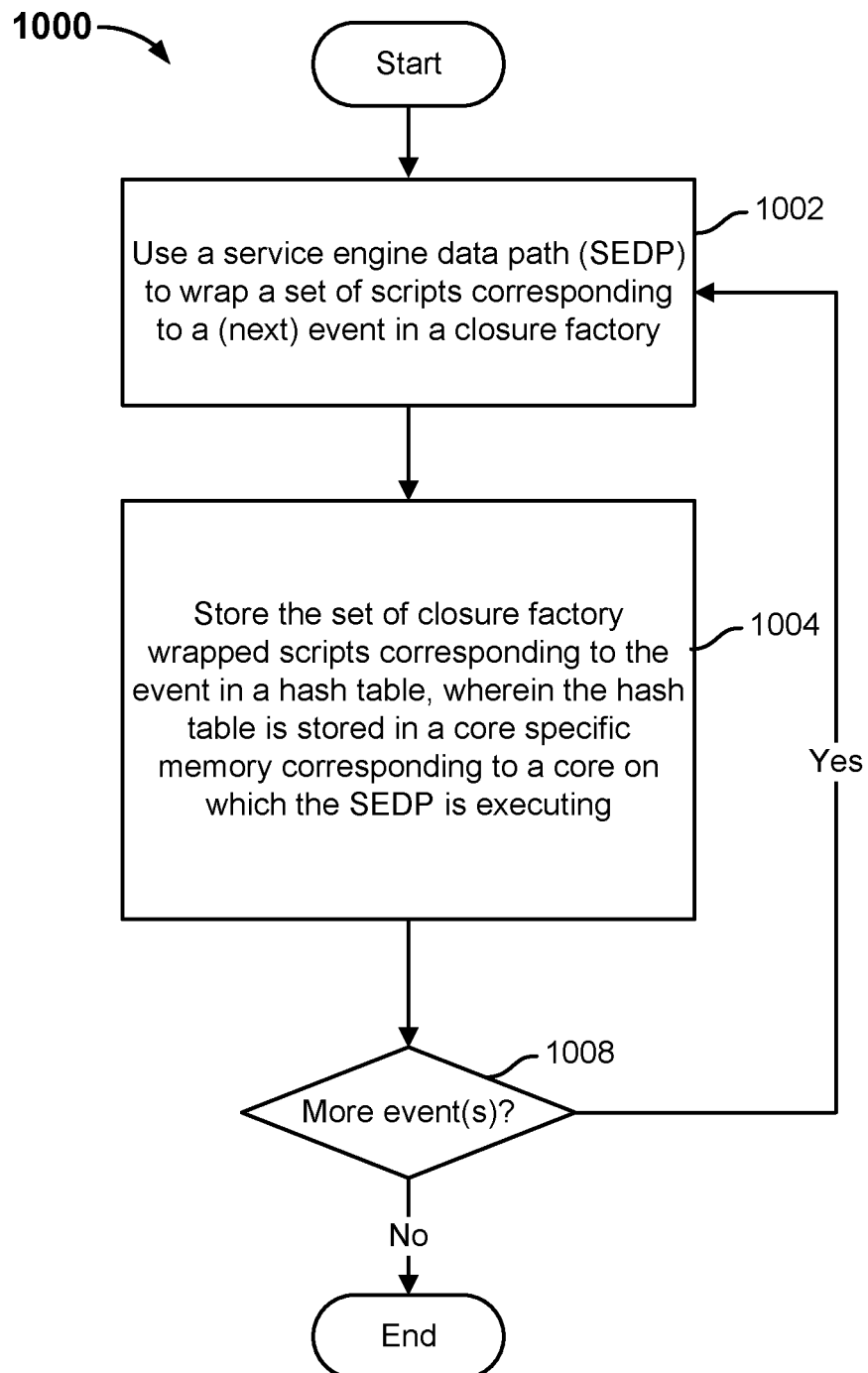
FIG. 10 is a flow diagram showing an example of a process for generating closure factory wrapped scripts during configuration time.

FIG. 10 is a flow diagram showing an example of a process for generating closure factory wrapped scripts during configuration time. In some embodiments, process 1000 is implemented at service engine 214 of FIG. 2 and service engine 314 of FIG. 3 at configuration time.

Process 1000 describes an example process of an SEDP process generating closure factory wrapped scripts (which could be in the form of sets of interpretable byte code) corresponding to each event that is identified in a set of virtual service configuration information for a specified virtual service. Process 1000 is performed by each SEDP process that is executing on a corresponding core of a service engine. For example, if the service engine included five cores, then process 1000 is performed five times, once by the corresponding SEDP process executing at each of the cores.

An instance of process 1000 may be performed by an SEDP process at a service engine for each virtual service for which a corresponding set of virtual service configuration information is received at the service engine.

In some embodiments, 908 and 910 of FIG. 9 are implemented at least in part by process 1000.

At 1002, a service engine data path (SEDP) is used to wrap a set of scripts corresponding to a (next) event in a corresponding closure factory. In various embodiments, the event context information that is stored in a shared memory at a service engine is used to determine which scripts are associated with a particular event that is identified in a set of virtual service configuration information for a specified virtual service. To wrap a script in a closure factory comprises to wrap or place the script within a closure generator, which in turn is a function wrapper over the original script.

At 1004, the set of closure factory wrapped scripts corresponding to the event is stored in a hash table, wherein the hash table is stored in a core specific memory corresponding to a core on which the SEDP is executing. In some embodiments, the set of closure factory wrapped scripts corresponding to each event is stored in a data structure such as a hash table in the parent interpreter context corresponding to the specified virtual service that is within the core specific memory corresponding to the core on which the SEDP is executing. In some embodiments, a (e.g., MD5) key corresponding to each script associated with an event has been generated based at least in part on the script and is stored in the event context information corresponding to the specified virtual service in the shared memory so that the key can be later used to access the stored closure factory wrapped script when its corresponding event(s) are detected by an SEDP.

At 1008, it is determined whether there is at least one more event that is identified from the set of virtual service configuration information. In the event that there is at least one more event, control is returned to 1002. Otherwise, if there are no more events, process 1000 ends. Steps 1002 and 1004 are repeated for each event that is identified from the set of virtual service configuration information for the specified virtual service.

Figure 11:
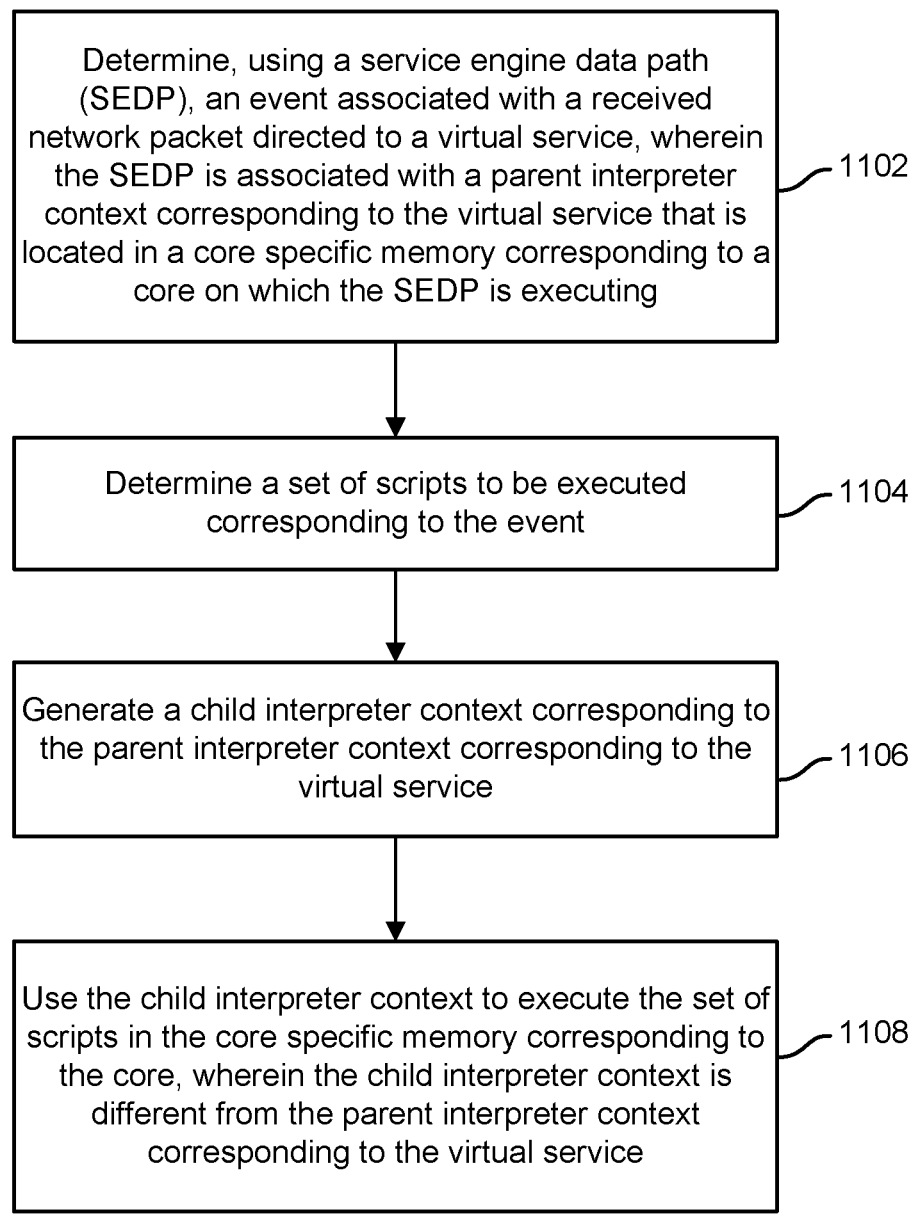
FIG. 11 is a flow diagram showing an embodiment of a process for network packet event related script execution during runtime.

FIG. 11 is a flow diagram showing an embodiment of a process for network packet event related script execution during runtime. In some embodiments, process 1100 is implemented at service engine 214 of FIG. 2 and service engine 314 of FIG. 3 at runtime.

At 1102, an event associated with a received network packet directed to a virtual service is determined using a service engine data path (SEDP), wherein the SEDP is associated with a parent interpreter context corresponding to the virtual service that is located in a core specific memory corresponding to a core on which the SEDP is executing. While the service engine is implementing, during runtime, one or more specified virtual services that are associated with corresponding sets of virtual service configuration that the service engine had previously received, network packets are received at the service engine. Each such network packet is distributed to a core of the service engine. In various embodiments, a corresponding SEDP process that is executing on the core determines one of the specified virtual services that are provided by the service engine that applies to the received network packet. Then, the SEDP determines one or more events associated with the received network packet.

At 1104, a set of scripts is determined to be executed corresponding to the event. In some embodiments, scripts that are to be executed for an event may be determined by calling an API using arguments such as, for example, the name of the event and the name of the specified virtual service that is applicable to the network packet and the API will look into the hash table that is stored in the corresponding interpreter context to determine whether any script(s) corresponding to the event are stored.

At 1106, a child interpreter context corresponding to the parent interpreter context corresponding to the virtual service is generated. A child interpreter context is spawned from the parent interpreter context in the core specific memory that is separate from the parent interpreter context corresponding to the virtual service that is applicable to the network packet.

At 1108, the child interpreter context is used to execute the set of scripts in the core specific memory corresponding to the core, wherein the child interpreter context is different from the parent interpreter context corresponding to the virtual service. Given that the interpreter context process is spawned from the parent interpreter context, the child interpreter context may access the contents stored in the parent interpreter context, including the relevant script(s) related to the event. In various embodiments, the child interpreter context is configured to execute the relevant script(s) related to the event.

Figure 12:
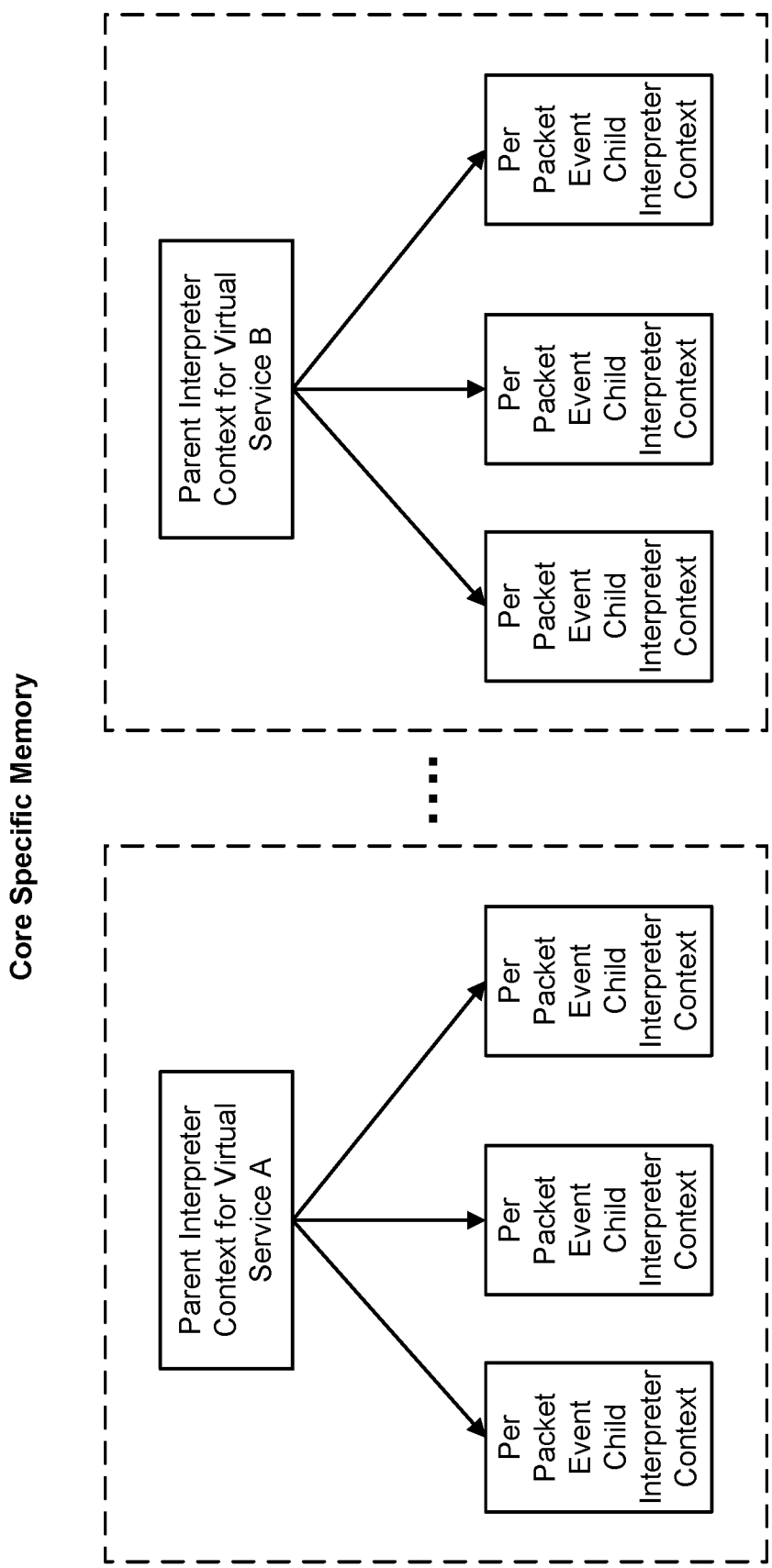
FIG. 12 is a diagram showing examples of a core specific memory at a service engine and the virtual service specific parent interpreter contexts and per packet event child interpreter child context(s) that are included in a core specific memory at runtime.

FIG. 12 is a diagram showing examples of a core specific memory at a service engine and the virtual service specific parent interpreter contexts and per packet event child interpreter child context(s) that are included in a core specific memory at runtime.

As described above, a parent interpreter context corresponding to a specified virtual service is generated in each core specific memory by the SEDP process that is executing at the core at the service engine to which the core specific memory (i.e., the SEDP specific memory) corresponds. At runtime, network packets that are received at the service engine are each distributed to the service engine's one or more cores. After an SEDP process of a core determines an applicable virtual service for a received network packet, the SEDP process determines one or more events associated with the network packet.

As shown in the example of FIG. 12, in various embodiments, a different per packet event child interpreter context is created for each event that is determined for each network packet. The child interpreter context is spawned from the parent interpreter context that corresponds to the virtual service that has been determined by the SEDP to apply to the network packet. In some embodiments, each child interpreter context is configured to execute the scripts associated with each event related to a network packet. The child interpreter context is garbage collected in the parent interpreter context after either the child interpreter context completes execution of the scripts related to a network packet event or if a crash has occurred in the child interpreter context. In some embodiments, only one child interpreter context is executing scripts for a network packet event at a time for a particular virtual service in the core specific CPU. Because the service engine can provide multiple virtual services at once, the example core specific memory at the service engine is shown in FIG. 12 to include a parent interpreter context corresponding to each such virtual service (Virtual Service A and Virtual Service B) and respective per packet event child interpreter contexts that are spawned from each parent interpreter context. By using different child interpreter contexts to handle the execution of event related scripts of different network packets, the script execution for each network packet event is isolated from one another as well as from the parent interpreter context, even when the network packets are handled by the same service engine core. As a result, any fatal crashes that occur during the execution of scripts in a particular child interpreter context will not negatively impact the parent interpreter context or any other per packet event child interpreter context in the same core specific memory.

Figure 13:
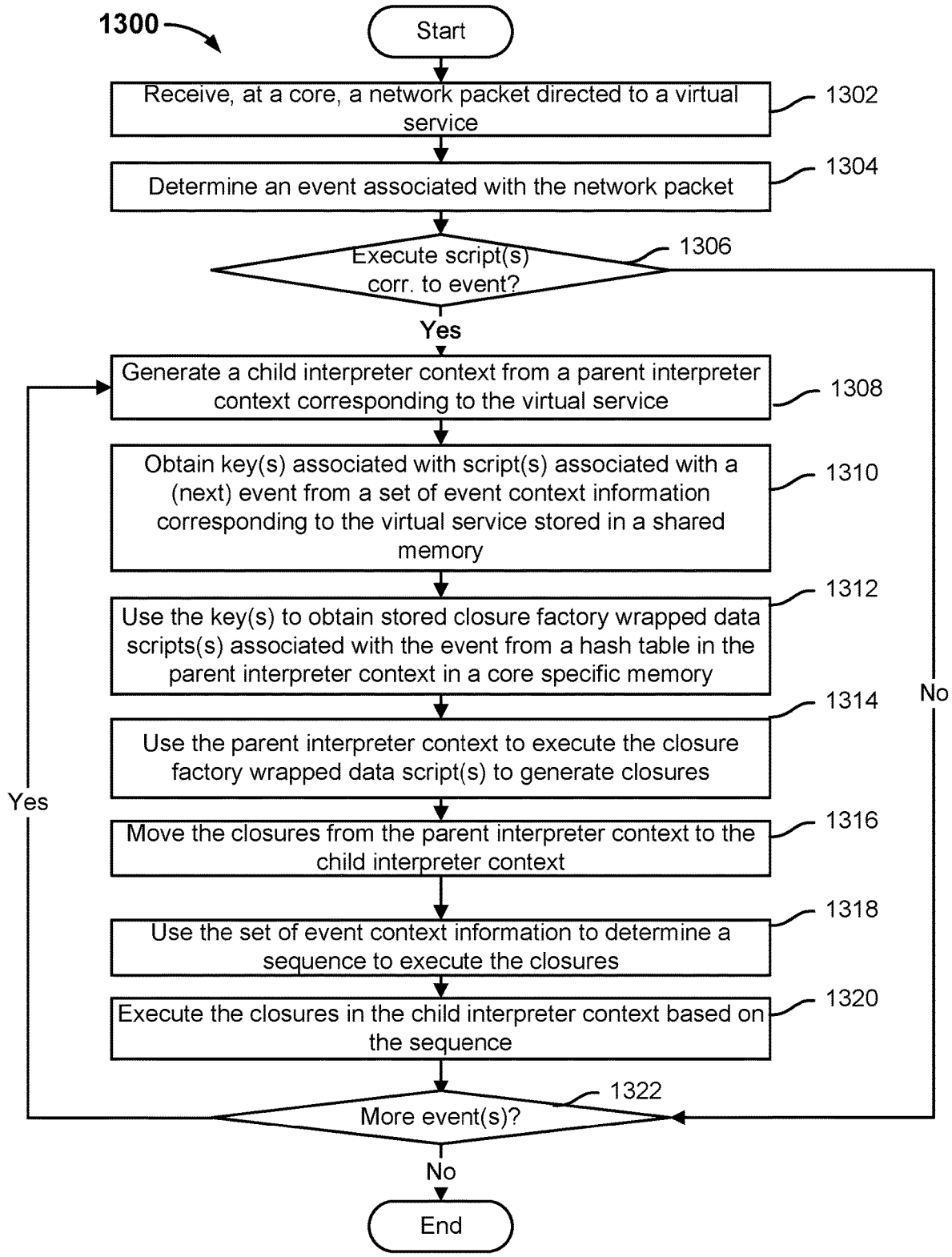
FIG. 13 is a flow diagram showing an example of a process for network packet event related script execution during runtime.

FIG. 13 is a flow diagram showing an example of a process for network packet event related script execution during runtime. In some embodiments, process 1300 is implemented at service engine 214 of FIG. 2 and service engine 314 of FIG. 3 at runtime. In some embodiments, process 1100 of FIG. 11 is implemented using the example of process 1300.

Process 1300 is an example process that is performed at a core of a service engine.

At 1302, a network packet directed to a virtual service is received at a core. Each network packet is distributed to a core at a service engine using an appropriate distribution scheme of distributing network packets that are received at the service engine to its various cores. For example, an applicable virtual service is determined for the network packet based on comparing one or more fields of the network packet to configuration information related to virtual services that are provided by the service engine.

At 1304, an event associated with the network packet is determined.

At 1306, it is determined whether to execute any script(s) related to the event. In the event that at least one script related to the event is to be executed, control is transferred to 1308. Otherwise, in the event that no more events for which scripts are to be executed, process 1300 ends. For example, the SEDP executing at the core can call an API using the name of the event and the handle to the applicable virtual service, which the API is configured to identify whether any scripts are associated with the combination of that event and that virtual service in the event context information at the shared memory.

At 1308, a child interpreter context is generated from a parent interpreter context corresponding to the virtual service. As mentioned above, a child interpreter context is spawned to execute the scripts pertaining to each event related to a network packet.

At 1310, key(s) associated with script(s) associated with a (next) event are obtained from a set of event context information corresponding to the virtual service stored in a shared memory. One or more (e.g., MD5) keys pertaining to respective script(s) associated with the event are obtained from the event context information corresponding to the virtual service that is stored at the shared memory of the service engine. For example, if there are three scripts that are associated with the event, then the three keys that correspond to the scripts are obtained from the event context information.

At 1312, the keys are used to obtain stored closure factory wrapped script(s) associated with the event from a hash table in the parent interpreter context in a core specific memory. Closure factory wrapped scripts (or another type of interpretable byte code that has been generated from the script(s) associated with the event as identified from a set of virtual service configuration information) are obtained using the obtained key from a hash table (or other type of data structure that allows key-value lookups).

At 1314, the parent interpreter context is used to execute the closure factory wrapped script(s) to generate closures. The closures that are generated from the executed closure factory wrapped script(s) are also interpretable byte code.

At 1316, the closures are moved from the parent interpreter context to the child interpreter context. For example, moving the closures from the parent into the per packet event child interpreter context includes causing the child interpreter context to point to the closures.

At 1318, the set of event context information is used to determine a sequence to execute the closures. The event context information includes data that identifies the sequence in which to execute scripts, which is derived from the sequence in which script objects were attached to the virtual service in the corresponding set of virtual service configuration information.

At 1320, the closures are executed in the child interpreter context based on the sequence. The closures, which correspond to the scripts that pertain to the event that was indicated in the set of virtual service configuration information, are executed in the per packet child event interpreter context in the sequence that was determined In some embodiments, a per event configuration knob (e.g., which can be implemented as a parameter or variable) is configured to control garbage collection for the script execution for each event. For example, if the script execution for the event is expected to be compute intensive, then garbage collection can be disabled during the script execution for that event and allowed to happen at the end of the script execution for that event. This is because stop and go garbage collection or even incremental garbage collection can affect data path forwarding performance due to the latency introduced in the script execution path.

At 1322, it is determined whether there are any more event(s) associated with the network packet. In the event that there is at least one more event associated with the network packet, control is returned to 1308, and another child interpreter context is generated from the parent interpreter context for the next event. Otherwise, in the event that there are no more events associated with the network packet, process 1300 ends. In some embodiments, after process 1300 ends, the per packet event child interpreter context is garbage collected and the child interpreter context is terminated.

Embodiments of configuring and executing network packet event related script execution are described herein. As described above, a script object includes at least one script to be executed for at least one network packet related event. Embodiments described herein enable script objects to be created and shared among multiple virtual services. Furthermore, script objects may be centrally updated and the changes can be propagated to each virtual service to which the script objects are attached. By allowing script objects to be created and updated centrally, the scripts to be executed for events related to network packets can be managed in a way that is efficient and also less susceptible to errors. Furthermore, embodiments described herein enable scripts to be executed for each detected event at runtime in a child interpreter context in a core specific memory of a service engine in a way that does not affect the parent interpreter context in the same core specific memory. As such, any issues (e.g., crashes) that occur with respect to the script execution in the child interpreter context will not negatively affect its parent interpreter context.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a core configured to:
   determine, using a service engine data path (SEDP) executing at the core, an event associated with a received network packet directed to a virtual service, wherein the SEDP is associated with a parent interpreter context (i) that corresponds to the virtual service and (ii) that is located in a core specific memory corresponding to the core;
   identify, for the event, a set of scripts of the virtual service to execute;
   generate, for the event, a child interpreter context from the parent interpreter context corresponding to the virtual service; and use the child interpreter context to execute the set of scripts, which were identified for the event, in the core specific memory corresponding to the core; and the core specific memory to store the parent interpreter context.

2. The system of claim 1, wherein the core is further configured to:

obtain a set of keys corresponding to the set of scripts corresponding to the event from a set of event context information stored at a shared memory; and use the set of keys to obtain the set of scripts corresponding to the event from a data structure in the parent interpreter context corresponding to the virtual service.

3. The system of claim 1, wherein the set of scripts corresponding to the event comprises a closure factory wrapped set of scripts corresponding to the event.

4. The system of claim 1, wherein the set of scripts corresponding to the event comprises interpretable byte code corresponding to the event.

5. The system of claim 1, wherein the core is further configured to determine a sequence in which to execute the set of scripts from a set of event context information stored at a shared memory and wherein to use the child interpreter context to execute the set of scripts in the core specific memory corresponding to the core comprises to execute the set of scripts based at least in part on the sequence.

6. The system of claim 1, wherein memory usage associated with using the child interpreter context to execute the set of scripts in the core specific memory corresponding to the core is associated with a memory pool type associated with runtime.

7. The system of claim 1, wherein the core is further configured to provide a configuration knob that is operable to control when garbage collection is permitted to be performed during the execution of the set of scripts using the child interpreter context.

8. A method, comprising:

determining, using a service engine data path (SEDP) executing at a core, an event associated with a received network packet directed to a virtual service, wherein the SEDP is associated with a parent interpreter context (i) that corresponds to the virtual service and (ii) that is located in a core specific memory corresponding to the core;

identifying, for the event, a set of scripts of the virtual service to execute;

generating, for the event, a child interpreter context from the parent interpreter context corresponding to the virtual service; and using the child interpreter context to execute the set of scripts, which were identified for the event, in the core specific memory corresponding to the core.

9. The method of claim 8, further comprising:

obtaining a set of keys corresponding to the set of scripts corresponding to the event from a set of event context information stored at a shared memory; and using the set of keys to obtain the set of scripts corresponding to the event from a data structure in the parent interpreter context corresponding to the virtual service.

10. The method of claim 8, wherein the set of scripts corresponding to the event comprises a closure factory wrapped set of scripts corresponding to the event.

11. The method of claim 8, wherein the set of scripts corresponding to the event comprises interpretable byte code corresponding to the event.

12. The method of claim 8, further comprising determining a sequence in which to execute the set of scripts from a set of event context information stored at a shared memory, wherein using the child interpreter context to execute the set of scripts in the core specific memory corresponding to the core comprises executing the set of scripts based at least in part on the sequence.

13. The method of claim 8, wherein memory usage associated with using the child interpreter context to execute the set of scripts in the core specific memory corresponding to the core is associated with a memory pool type associated with runtime.

14. The method of claim 8, further comprising:

providing a configuration knob that is operable to control when garbage collection is permitted to be performed during the execution of the set of scripts using the child interpreter context.

15. A non-transitory machine readable medium storing a program, the program for execution by at least one processing unit, the program comprising sets of instructions for:

determining, using a service engine data path (SEDP) executing at a core, an event associated with a received network packet directed to a virtual service, wherein the SEDP is associated with a parent interpreter context (i) that corresponds to the virtual service and (ii) that is located in a core specific memory corresponding to the core;

identifying, for the event, a set of scripts of the virtual service to execute;

generating, for the event, a child interpreter context from the parent interpreter context corresponding to the virtual service; and using the child interpreter context to execute the set of scripts, which were identified for the event, in the core specific memory corresponding to the core.

16. The non-transitory machine readable medium of claim 15, the program further comprising sets of instructions for:

obtaining a set of keys corresponding to the set of scripts corresponding to the event from a set of event context information stored at a shared memory; and using the set of keys to obtain the set of scripts corresponding to the event from a data structure in the parent interpreter context corresponding to the virtual service.

17. The non-transitory machine readable medium of claim 15, wherein the set of scripts corresponding to the event comprises a closure factory wrapped set of scripts corresponding to the event.

18. The non-transitory machine readable medium of claim 15, wherein the set of scripts corresponding to the event comprises interpretable byte code corresponding to the event.

19. The non-transitory machine readable medium of claim 15, the program further comprising a set of instructions for determining a sequence in which to execute the set of scripts from a set of event context information stored at a shared memory, wherein the set of instructions for using the child interpreter context to execute the set of scripts in the core specific memory corresponding to the core comprises a set of instructions for executing the set of scripts based at least in part on the sequence.

20. The non-transitory machine readable medium of claim 15, wherein memory usage associated with the set of instructions for using the child interpreter context to execute the set of scripts in the core specific memory corresponding to the core is associated with a memory pool type associated with runtime.

* * * * *